United States Patent

Goldsberry

[15] 3,648,249

[45] Mar. 7, 1972

[54] AUDIO-RESPONSIVE VISUAL DISPLAY SYSTEM INCORPORATING AUDIO AND DIGITAL INFORMATION SEGMENTATION AND COORDINATION

[72] Inventor: Paul E. Goldsberry, Lexington, Ky.

[73] Assignee: International Business Machines Corporation, Armonk, N.Y.

[22] Filed: Dec. 8, 1970

[21] Appl. No.: 96,036

[52] U.S. Cl. ................340/172.5, 179/100.1 DR, 340/324 A
[51] Int. Cl. ..........................................G06f 7/00, G11b 11/00
[58] Field of Search ....................................340/172.5, 324 A; 179/100.1 DR, 2 TV, 6 R, 6 C

[56] References Cited

UNITED STATES PATENTS

| | | | |
|---|---|---|---|
| 3,222,460 | 12/1965 | Albanes et al. | 179/100.1 DR |
| 3,300,586 | 1/1967 | Shepard | 340/172.5 X |
| 3,403,225 | 9/1968 | Mislan et al. | 179/2 R |
| 3,417,202 | 12/1968 | Kolpek | 179/2 R X |
| 3,512,132 | 5/1970 | Jones et al. | 340/172.5 |
| 3,587,053 | 6/1971 | Horzepa et al. | 340/172.5 |

*Primary Examiner*—Paul J. Henon
*Assistant Examiner*—M. Chapnick
*Attorney*—Hanifin and Jancin and John W. Girvin, Jr.

[57] ABSTRACT

Each of a plurality of segments of dictated audio information from a plurality of remote author terminals is switched under system control to one of a plurality of operator transcription stations for transcription of the audio information. System controls further effect the placement of transcribed information in machine readable form in system storage in proper sequence for display at the originating author terminal. System controls are facilitated by the recording of digital identification signals alongside recorded segments of audio information, the digital signals insuring proper system information identification and sequencing. Simple author controls enable selected text recall and display, text form and content modification and text highlighting. Further author controls effect audio text segmentation.

12 Claims, 16 Drawing Figures

INVENTOR
PAUL E. GOLDSBERRY

BY John W Girvin, Jr
ATTORNEY.

Patented March 7, 1972 3,648,249

14 Sheets-Sheet 12

AUDIO-RESPONSIVE VISUAL DISPLAY SYSTEM INCORPORATING AUDIO AND DIGITAL INFORMATION SEGMENTATION AND COORDINATION

CROSS-REFERENCES TO RELATED APPLICATIONS

The following applications are assigned to the same assignee as the present application:

U.S. patent application Ser. No. 782,285, filed Dec. 9, 1968, entitled "Automatic Data Composing, Editing and Formatting System," Paul E. Goldsberry et al., inventors.

U.S. patent application Ser. No. 737,642 filed June 17, 1968 now U.S. Pat. No. 3,549,821 entitled "Tone Actuated Dictation System with Voice Buffer Options," M. P. Langendorf et al., inventors.

U.S. patent application Ser. No. 15,791, filed Mar. 2, 1970, entitled "Proportional Spacing Visual Editing System," Robert G. Bluethman et al., inventors.

U.S. patent application Ser. No. 15,793, filed Mar. 2, 1970, entitled "Visual Editing System Incorporating Selectable Letter Spacing Display and Associated Scale Display," Robert L. McConnell et al., inventors.

U. S. patent application Ser. No. 15,792, filed Mar. 2, 1970, entitled "Visual Editing System Incorporating Controls for Justifying and Dejustifying Text," Robert G. Bluethman et al. inventors.

BACKGROUND OF THE INVENTION

1. Field

This invention relates to a data processing system responsive to dictated audio information and control signals from remote terminals for controlling the transcription of the audio information into digital signals for display at the generating terminal.

2. Description of the Prior Art

The preparation of modern business documents and the like often involves the generation of a first draft of the document by the author who either writes the document manually or dictates words to a transcriber or to an audio recording device for subsequent transcription. The first draft is thereafter typed and can be subsequently revised by the author utilizing the same procedures of writing or dictation. Various commercial devices are utilized to record a machine readable record of the first typed draft to facilitate rapid revision of a document by a secretary. Additionally, text display systems responsive to the machine readable record are utilized to display drafts for ready revision by the author or secretary. However, none of these devices and systems provides a printed output representation of the author's thoughts within a short time period after such thoughts have been orally communicated.

Authorship studies indicate that writing activity can be divided into various phases: data collection and thinking; early writing and verbalization; improving thought organization and textual clarity; and a final polishing of phrasing, grammar, and format. These phases indicate that the more difficult writing tasks are completed through iterative work activity. Review of work is used to stimulate thoughts for text additions, corrections, and organization. A review of man's communicating ability shows that reading is the most efficient and natural means of reviewing work while voice communication is the most efficient means of transmitting mental concepts. While the above prior art dictation and recording devices are responsive to voice communication to provide a visual record for revision there is a great time lag between the initial dictation and the subsequent transcription of a reviewable document. Since authors generally proceed onto other tasks during the time lag, their thoughts are often lost and it is necessary that the author spend much time reviewing his previous thoughts.

Accordingly, much work has been done over the years to perfect a system that is responsive to voice for producing an immediate visual representation of the dictated words. Such "-voice recognition" devices have had notable shortcomings such as limited vocabulary, extreme complexity, and high cost resulting in a complete lack of commercial utilization. Another approach has been to dictate to a plurality of remote transcribers through a PBX system. While such systems reduce the time lag between dictation and first draft, the response is far from immediate resulting in the same shortcomings to the author noted above.

SUMMARY

In order to overcome the above noted shortcomings of the prior art, the present invention provides a data processing system responsive to segments of dictated text generated at a plurality of author stations for causing each text segment to be routed to one of a plurality of transcribers. The transcribed segment is placed in proper sequence with other text segments of the same author and transmitted to the author station for display on a temporary display screen. The author may then effect rearrangement of the displayed text, reformat the displayed text or modify the content of selected portions of the displayed text by manipulating simple controls. For example, the author may specify a point in the test where he wishes to insert further words by dictating them. The system bulk digital storage is large enabling author recall of long documents for revision. Once such a document is completely revised, it can be printed or outputted to a secondary media for subsequent print out.

Dictated words comprising an audio text segment are recorded with corresponding digital identification information on a magnetic medium. Each segment is transferred under system control to a second recording device associated with each transcription station. The transcriber listens to the audio words and transcribed them in a conventional manner by depressing letter keybuttons. A temporary display associated with each transcription station enables the transcriber to review the keyed information for accuracy prior to releasing it to the system. The system keeps track of the sequence of assignments of audio segments to insure proper sequence of the displayed text at the author station. Once a text segment is transcribed and placed in proper sequence in text storage, it is operated upon by a text processor which arranges the test within a specified format. The thus arranged digital text is then transmitted to the author station for display on a cathode ray tube (CRT) display.

The author display controls communicate with the text storage and text processor to effect displayed text revision. Additional controls enable the author to cause selected portions of the displayed text to be displayed at a transcription station for correction of obvious spelling errors and the like.

Since a plurality of transcribers can be responsive to the spoken words of one author, the time lag between dictation and the provision of the first draft on the CRT display is far shorter than that experienced with prior systems. Additionally, the author editing controls provide a rapid means of revising the first draft "copy" into a final copy form. The system further enables the sharing on a time basis by many authors of a central pool of transcribers. Built in controls prevent overloading of the system by too many authors and provide a built in author priority system.

The foregoing and other features and advantages of the invention will be apparent from the following more particular description of the preferred embodiment as illustrated in the accompanying drawings:

GENERAL DESCRIPTION

Figure 1:
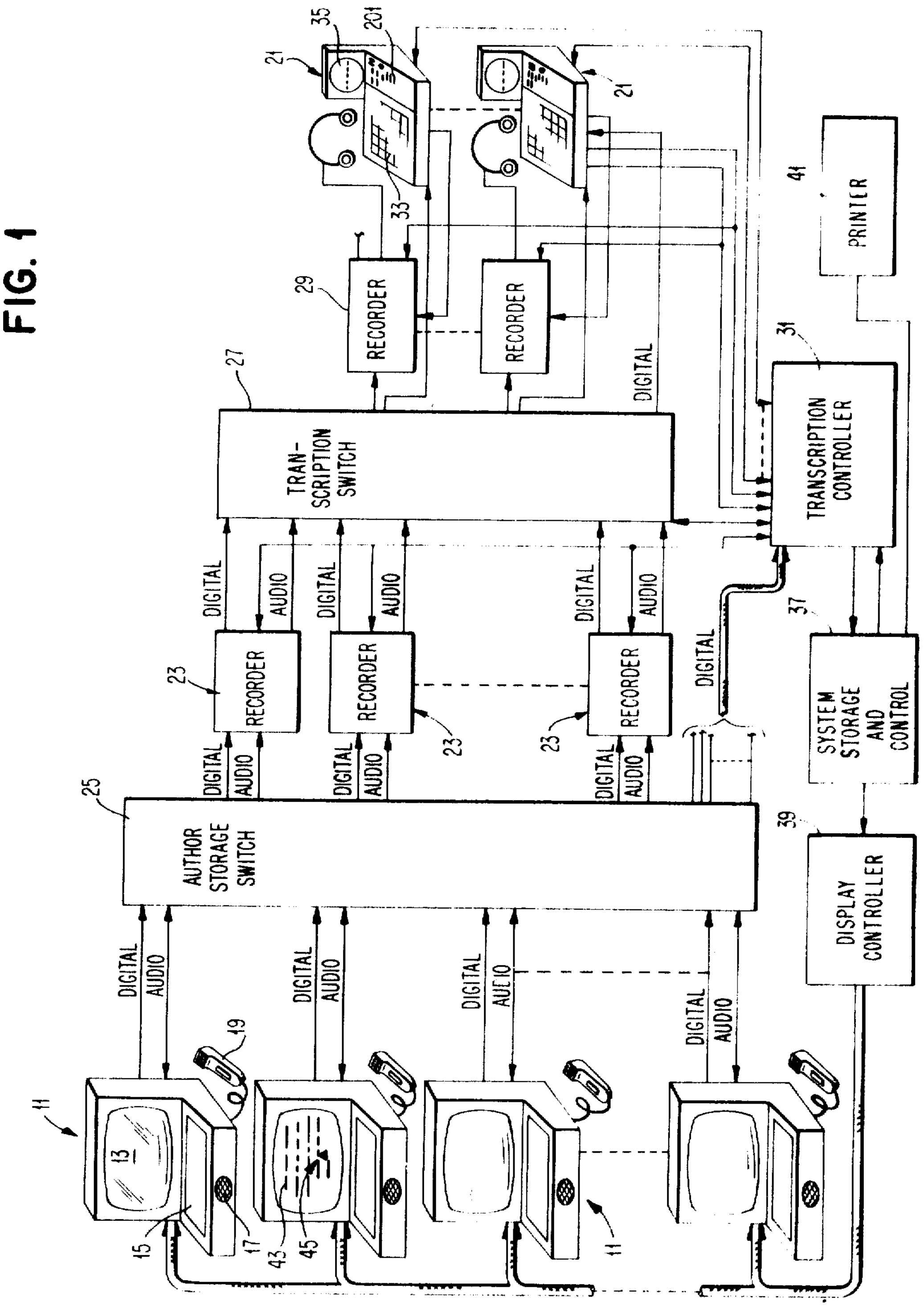
FIG. 1 is a block diagram of the overall system configuration.

Referring now to FIG. 1 of the drawings, a block diagram of the overall system configuration is depicted. The system consists of a plurality of author stations 11 each incorporating a visual display screen 13, a control keyboard 15, a speaker 17 and an audio transducer 19 for recording audio information. In operation, the author dictates to the audio transducer 19 in a conventional manner. Thereafter, the dictated words are transcribed at a remote keying station and then displayed on the display 13. Transfer of the audio information from the author station 11 to a remote keying station 21 is accomplished by recording the information on one of a plurality of recorders 23. Selection of a recorder is accomplished through the author storage switching system 25. This system operates in a manner similar to a conventional PBX system wherein the author makes a dial type connection to a free recorder 23. Once such a connection is effected, it is maintained until the author initiates a control which releases the connection. Both audio information dictated and digital information identifying the dictation is transferred to the recorder 23. Thereafter, the information at the recorder 23 is transferred through the transcription switching system 27 to a transcription recorder 29. The transcription controller 31 is responsive to the digital signals generated at the author station to subsequently effect control of the transfer of the audio information from the recorders 23 to the transcription recorders 29. Once a segment of dictation text is recorded by a transcription recorder 29, the transcriber may thereafter listen to it in a conventional manner and key corresponding text symbols on the typewriter keyboard 33. The keyed symbols are temporarily stored in digital form in a buffer storage device located at the keying station 21 and are displayed on a display screen 35. Additionally, the digital identification information corresponding to the keyed text is stored in the buffer. Once the complete segment is transcribed to the liking of the transcriber, the transcriber depresses a button releasing the information stored in the keying station buffer to an input buffer in the transcription controller 31. An instruction identifying the author who dictated the keyed text information and the relative location of the thus transcribed text with previously transcribed text is transferred along with the text information in the input buffer to the system storage and control unit 37. The system storage and control unit 37 effects the proper placement of the text in sequence and thereafter effects a transfer of the thus inserted text along with previously transcribed text to the display controller 39. Text transmitted to the display controller 39 is transmitted to the generating author station 11 for display on the display screen 13.

As previously described, both audio and digital information is transferred from the author station to a selected recorder 23. The digital information identifies the author station, the text segment location, each text segment being assigned a consecutive number, and the type of operation (e.g., dictation or text insertion) desired by the author. Additional digital signals specify such operations as delete text, text transposition, and text reformatting. These additional signals are routed directly to the transcription controller 31 which accumulates instruction codes and thereafter sends instruction signals to the system storage and control unit 37 which is operative to carry out the instructions specified. The thus updated text is thereafter displayed through the display controller 39 and author station storage as has been described. Once a document has been dictated, reviewed and updated by the author, the author may send a further digital signal causing the system storage and control unit 37 to print the stored information on a printer 41 which may be one of many located proximate the author station or a single printer located at a central mailing facility.

The display of the text information at the author station is similar to the display of a typewritten page on an output printer. That is, lines 43 of text are displayed in the same sequence that they would be printed out. As the text is thus displayed, the author may review the text and note obviously misspelled words, change the sequence of displayed text words, delete text words, insert grammatical punctuation marks in the displayed words, and note a point at which dictated words will be subsequently inserted in the middle of displayed text. A conventional cursor or marker symbol 45 can be moved about the displayed text to indicate the word to be deleted, moved or highlighted as well as to indicate an insertion point. The cursor thus marks the displayed text for subsequent operations and is controlled from the keyboard 15. In the description which follows, the major components of each of the blocks depicted in FIG. 1 will be described. Thereafter, a description of the operation of the system depicted in FIG. 1 will follow.

DETAILED DESCRIPTION

Figure 2:
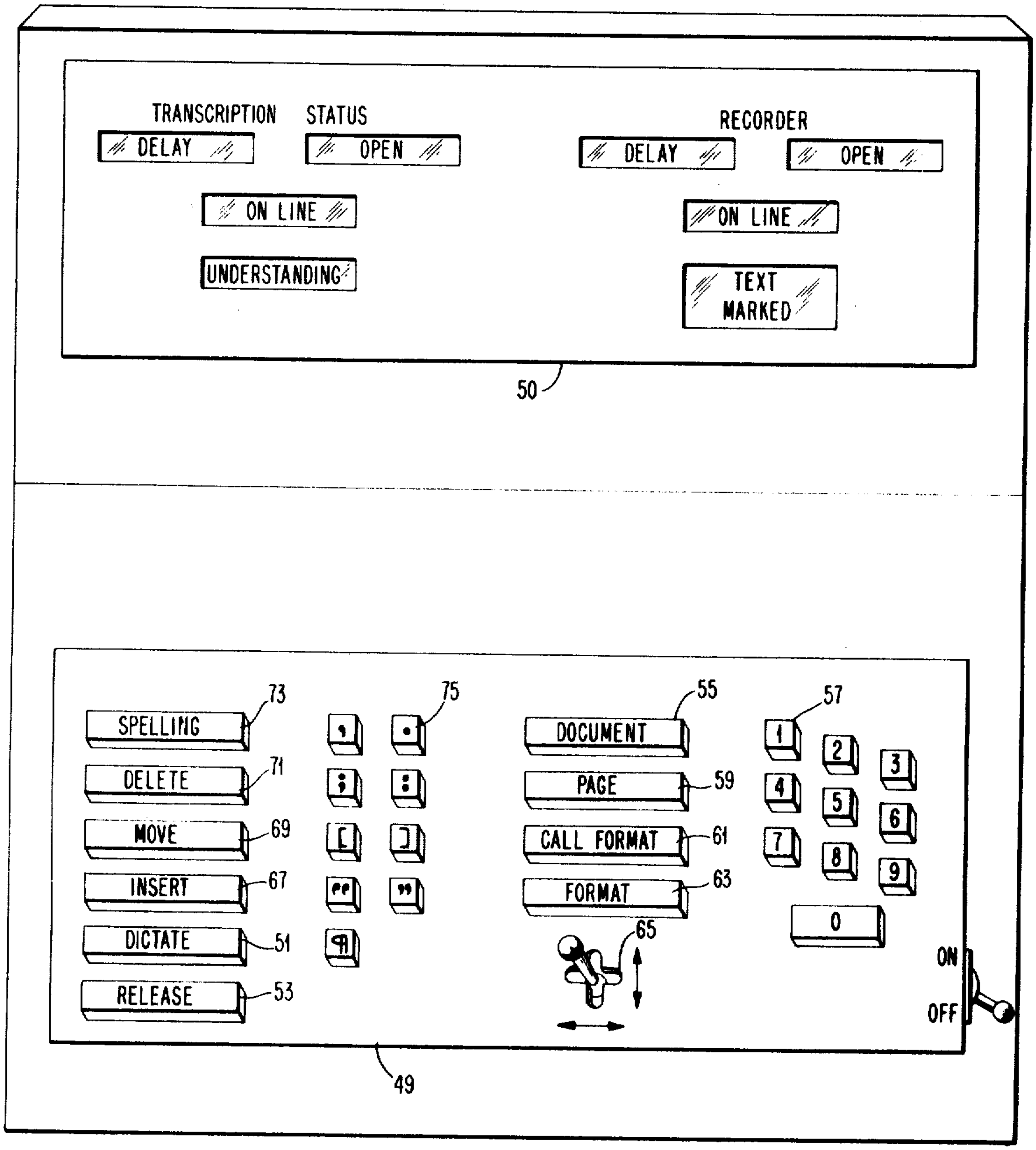
FIG. 2 is a pictorial illustration of an author keyboard and indicator panel.

Referring now to FIG. 2 of the drawings, a pictorial illustration of the author keyboard 49 and indicator panel 50 associated with each author station 11 of FIG. 1 is depicted. The indicator lights mark the status of the recorder and transcriber stations of the system. That is, the author at each station location can determine whether there is an available recording device for his audio dictation and can further determine the approximate amount of delay that will take place between dictation and subsequent display of the dictated information. Thus, the indicators indicate whether a recorder is open for use by the author, or whether there will be delay in obtaining a recorder because all of the other recorders are utilized by other author stations. Additionally, an on line indicator indicates that the author station is presently connected to a recorder. The transcription status indicators indicate that a transcriber is immediately available or open to receiving dictation, that all transcribers are presently tied up transcribing segments thereby necessitating a delay, or that a transcriber is transcribing text dictated at that particular author station. An additional indicator indicates that the transcriber cannot understand the dictated text and a further indicator indicates that the author has marked text for a data manipulation operation such as a data delete operation.

The author keyboard includes control keys for specifying a particular operation as well as control keys for marking text. The system is responsive to the depression of the "dictate" key 51 to initiate a connection between the author station and an open recorder. The system is responsive to the depression of the release key 53 to disconnect the author station from a previously selected recorder. Depression of the document key 55 followed by depression of a numeric keybutton 57 causes an identified document to be placed into immediate access system storage for display on the author station display screen. Thereafter, the author can effect the display of a specified paragraph of the thus identified document by depressing the page keybutton 59 and thereafter indicate the page number by depressing appropriate numeric keybuttons 57. Once a desired document and page thereof is located for display, the call format keybutton 61 is utilized to recall a specific document format from storage and the format keybutton 63 is utilized to cause the text displayed to conform to the recalled format.

Toggle switch 65 is operative to cause horizontal and/or vertical movement of the cursor or marker symbol displayed on the display screen. Once the cursor is positioned to mark a text segment, various text modification operations may be initiated by further keybutton depression. Depression of the insert keybutton 67 followed by dictation causes the transcribed dictation to be inserted at a point in the displayed text identified by the cursor symbol. Depression of the move keybutton 69 followed by movement of the cursor key 65 causes the system to rearrange the sequence of the displayed text. Depression of the delete keybutton 71 causes the text displayed at the cursor location to be deleted. Depression of the spelling keybutton 73 causes the word adjacent the cursor location of the author's display screen to be displayed at a transcriber station for correction of obvious spelling errors. Depression of one of the various grammatical keybuttons 75 causes a corresponding grammatical punctuation symbol to be inserted in the data stream at the cursor location.

Figure 3:
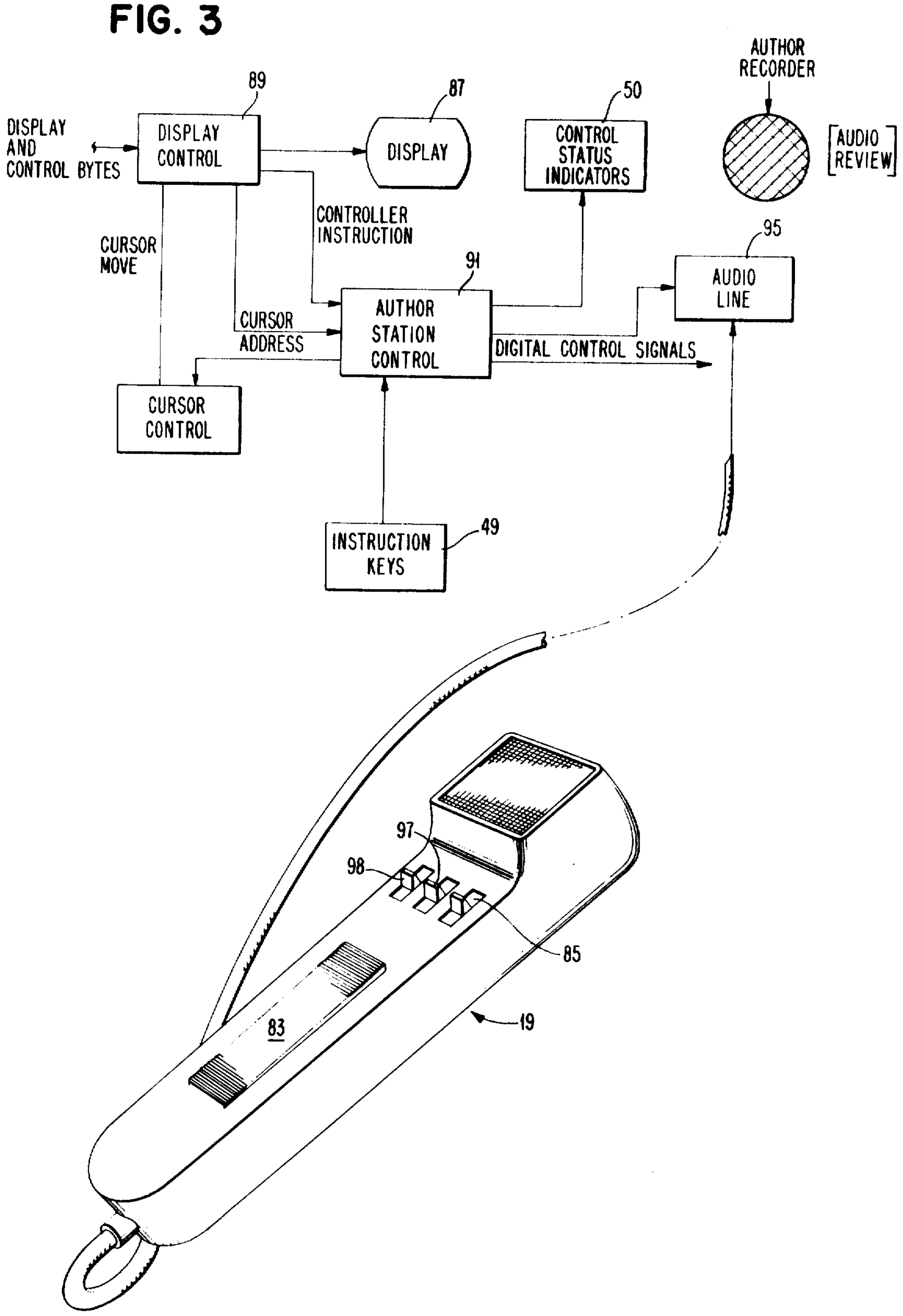
FIG. 3 is a general block diagram of an author station.

Referring now to FIG. 3 of the drawings, a general block diagram of the author station showing each of the major components of this station is depicted. This station consists of a typical audio transducer 19 having a conventional dictate control 83 for transducing sound into electrical signals, a sound review control 85, and a display unit 87 which is responsive to signals transmitted by the display control 89 to effect the display of alphanumeric characters on a display screen. The display device 87 could be structured similar to that of the IBM 2265 display unit currently in commercial use. Such a display device requires an input stream of coded text symbols to be displayed followed by a command to retrace the display beam horizontally. During the retrace time, various control signals can be supplied to the author station from the system. These control signals are stripped by the display control 89 and routed to an author station control 91. Such control signals include the control status indicator information for actuating the indicators 50, cursor location information, and a synchronizing signal from which clocking information is derived by the author station control 91. The clocking signal and clocking information controls the timed generation of the digital information control signals which are transmitted to the system recorder and to the system controllers.

When the dictate control 83 is depressed, audio sounds transduced by the audio transducer 19 are transmitted to the audio communication line 95 which is connected through a switching system to a remote recorder. Depression of the dictate control 83 further sends a signal to the author station control 91 indicating that dictation has been initiated. This signal causes a timed high-frequency tone to be generated by the author station control which is transmitted to the audio line 95 to ensure that the audio recorder will remain on for a sufficient duration to record all digital control signals generated. The author station control 91 further generates a series of digital control signals to be recorded in parallel with the audio signal by the remote recording device, the digital control signals identifying the author station and the segment of dictation. Additionally, the digital control signals further specify whether a normal dictation operation is in progress or whether a dictation insertion operation is in progress.

When the author wishes to review audio information dictated, the review control 85 is moved causing the audio recorder to back up to the beginning of the dictated segment. If the listen control 97 is thereafter moved, the digital information associated with the previously dictated segment and recorded therewith remains unchanged. If, however, the dictate control 83 is depressed, a new set of digital information is recorded over the previously recorded set and newly dictated audio information is recorded over previously recorded audio information. Movement of segment control 98 effects the generation of a digital signal identifying a text segment ending. Only complete segments can be released to the transcriber. Thus, the author can control segment length.

As heretofore described, various instructions can be initiated at the author station which do not require the transcription of audio information by author depression of instruction keys 39. Depression of such instruction keys causes the author station control 91 to generate digital control signals to the various system control units. These control signals are synchronized to the clocking signal as are the digital control signals which are recorded. The system response to such signals and their content for the various system operations will be described hereinafter.

Figure 4:
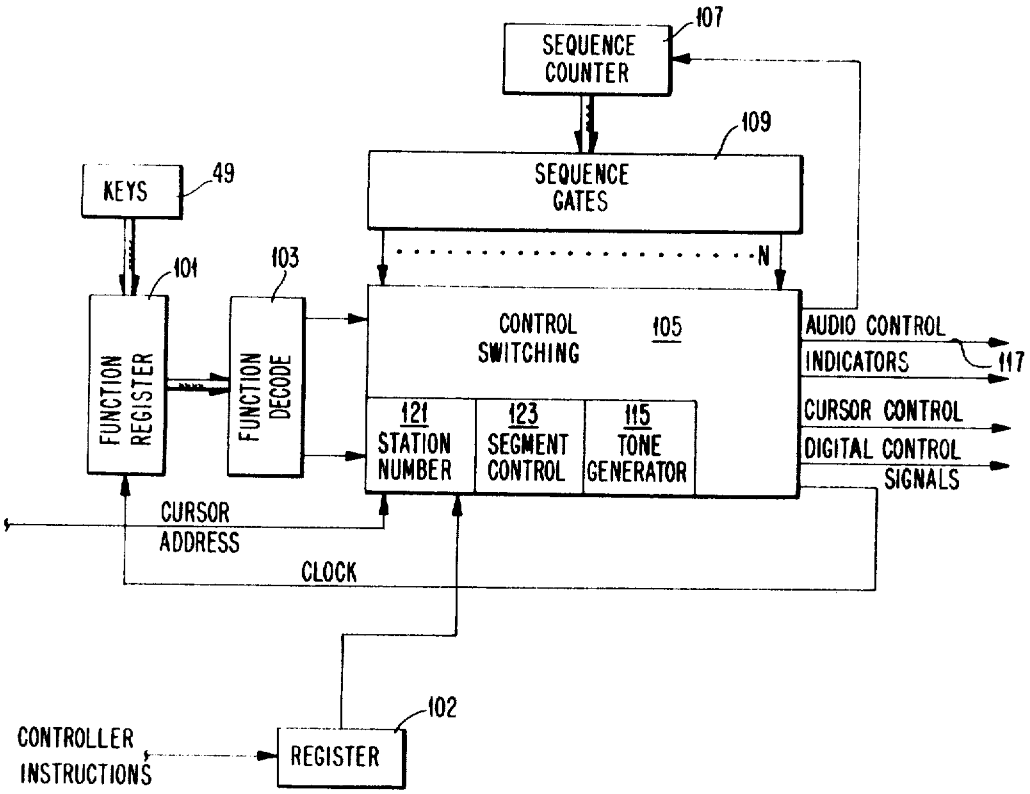
FIG. 4 is a block diagram of the author station control unit.

Referring now to FIG. 4 of the drawings, a more detailed block diagram representation of the author station control unit 91 of FIG. 3 is depicted. As previously described, this unit is responsive to the audio transducer, the display control and instruction keys 49 to generate digital control signals which are utilized by the system and/or are recorded on the remote recorder. Information from the keyboard 49 is transmitted to a function register 101 and decoded by the function decode 103 which indicates to the control switching unit 105 which operation is to be performed. The information stream from the display control including synchronization signals are gated from the register 102 to the control switching unit 105 which generates a clock signal to synchronize the sequence counter 107 which, in conjunction with the sequence gates 109, provide a series of timing windows utilized to time the transmission of the digital control information in proper time sequence with system operation. The clock signals generated by the control switching unit 105 gate and sequence the function register 101.

As previously indicated, each time the dictate control of the audio transducer is depressed, a tone generator 115 is actuated to supply an audio signal to the audio line 117. This signal, which is of an inaudible frequency, ensures that the audio recorder remains on for a period of time sufficient to record all digital control signals sequenced by the sequence gates 109. For a typical dictate operation, the control signals include signals representative of the station number which is generated from a fixed station number register 121 as well as a sequential segment number generated by a segment counter 123. Specific sequences of the digital control signals generated by the control switching unit 105 in accordance with the various operations and timing will be described hereinafter. It should also be noted that the tone generator 115 is actuated to supply control tone signals to control the recording device in response to actuation of the review control, listen control and segment control. The use of such a tone actuated recording system is described in the afore referenced application of M. P. Langendorf et al. and in U.S. Pat. No. 3,527,312 entitled "Tone Actuated Dictation System" and assigned to the same assignee as the present invention.

Referring once again to FIG. 1 of the drawings, the basic control configuration of each author station 11 has been described. The audio information entered into the audio transducer 19 along with corresponding digital control information is routed through an author storage switching system 25 to a recorder 23. The use of such an author storage switching system 25 enables the utilization of fewer recorders that author stations since it has been found that author stations remain idle for long periods of time. Accordingly, a conventional PBX switch incorporating two parallel paths instead of the usual one path can be utilized to establish a path between the author station 11 and a recorder 23 for the parallel digital and audio information. As described heretofore, once such a path is established, it is maintained until the author releases it by depressing a keybutton. It should be noted at this point that a recorder could be physically located at each author station thereby eliminating the need for the author storage switching system.

Figure 5:
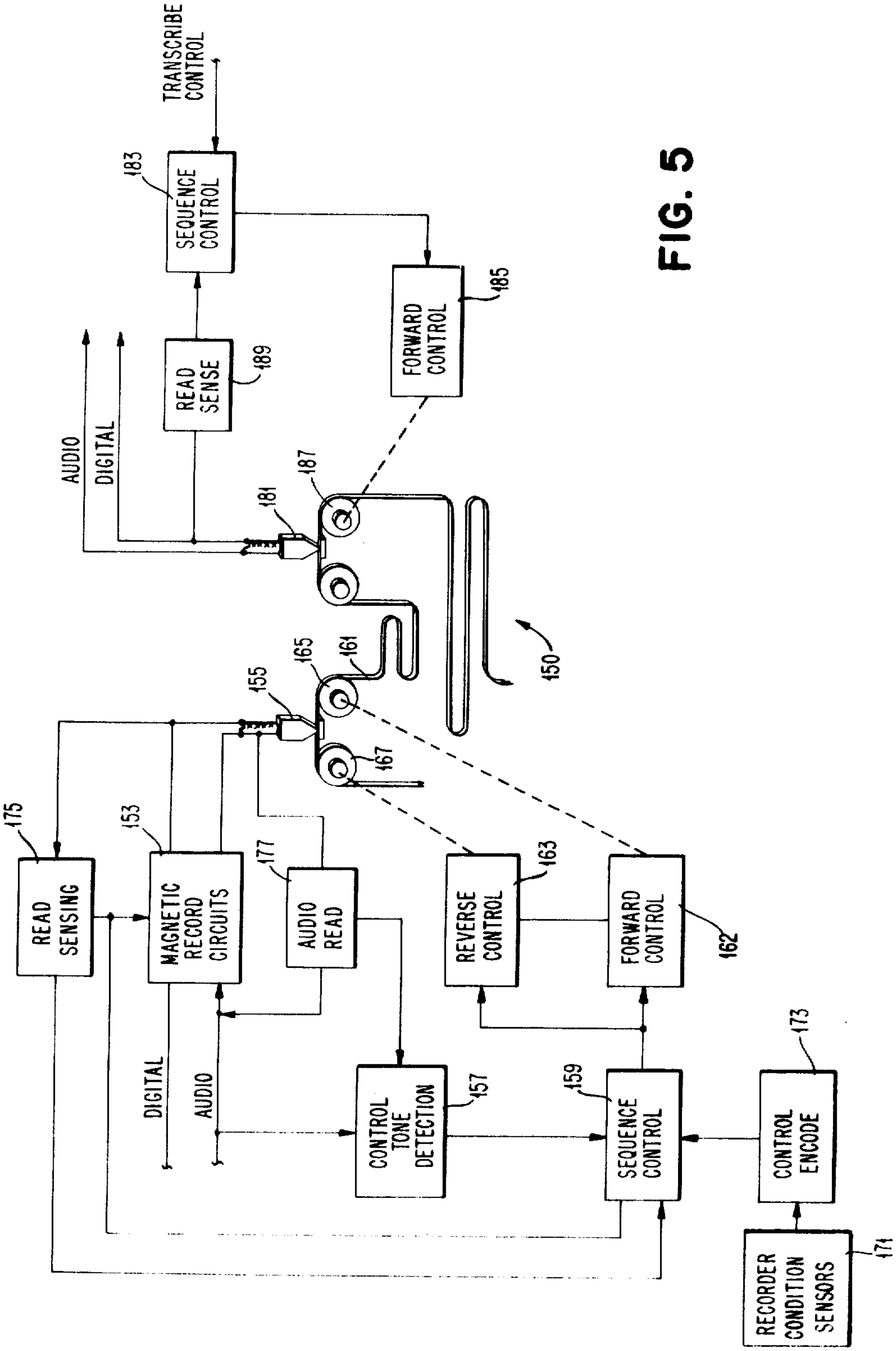
FIG. 5 is a block diagram of a recorder station.

Referring now to FIG. 5 of the drawings, a block diagram of a single recorder 23 is depicted. This recorder is of a conventional nature and is responsive to tone signals generated at the author station representing commands such as forward dictation, reverse and playback. ADditionally, the system is voice actuated so that the recording media is moved with respect to the recording transducer only when voice or tone signals appear on the audio line.

The recorder consists of a two station audio and digital recorder/reproducer mechanism 150. The parallel digital and audio signal information is transmitted from the author storage switching system to magnetic recording circuits 153 which provide recording signals to parallel spaced digital and audio transducers located in the transducing head 155. The appearance of signals on the audio line which can be either a tone or voice signal is detected by the control tone detection circuit 157. This circuit transmits signals to the sequence control unit 159 which in turn effects forward motion of the recording tape 161 with respect to the transducing head 155 during recording operations. During an audio playback operation, the sequence control is responsive to the control tone detection circuit to effect reverse motion of the tape 161 with respect to the transducer 155. Both forward and reverse motion is respectively effected by the forward control circuit 162 and the reverse control circuit 163 which in turn control motion of the forward drive capstan 165 and the reverse drive capstan 167. Various recorder-condition-sensing devices 171 transmit control signals to the control encode unit 173 which in turn causes the sequence control unit 159 to terminate or initiate recording operations. Tape tension controls and recording level signal controls are representative of such feedback-sensing signals.

When a tape reverse command which initiates a playback operation is received, the sequence control 159 initiates motion of the reverse capstan 167. The digital read sensing circuit 175 is responsive to instructions recorded on the tape indicating the beginning of a segment and supplies a signal to the sequence control unit 159 to halt reverse motion at the begging of a segment. Subsequent signals generated at the author station to reverse tape motion are inoperative until there has been forward tape motion. Thereafter, if a playback command is received, the forward control 162 causes the forward drive capstan 165 to rotate and the previously recorded audio information is sensed by the audio read circuit 177 and transmitted to the audio speaker at the author station. When the audio read station 177 no longer senses audio recorded information, or when the author terminates audio playback, a signal is transmitted to the sequence control unit 159 to halt playback. As heretofore described, both audio and digital information can be recorded over a previously dictated segment. This is accomplished by selecting a dictate mode instead of a playback mode once the tape has been reversed.

Once the author indicates the end of a segment of dictation, a digital signal is recorded on the tape 161. Additionally, a control signal is transmitted to the transcription control unit 31 of FIG. 1. Subsequent segments of dictation may thereafter be dictated on the tape 161 prior to read out of the first segment to a transcription recorder. The thus recorded tape is physically placed in a bin (not shown) located between the recording transducer 155 and the playback transducer 181. When a transcriber station is available to receive a previously recorded segment from the recorder 150, the transcription controller provides a signal to sequence control 183 which gates the forward control 185 to effect motion of the forward drive capstan 187 of the playback unit. Motion of the drive capstan 187 causes a previously recorded segment to pass the transducer 181 and the audio signal thus sensed is transmitted to a selected transcriber recorder. Additionally, digital signals are transduced and transmitted to a buffer storage unit at the transcriber station. The digital signals are additionally sent to the read sense unit 189 which indicates to the sequence control 183 when a complete segment has been transduced. The sequence control then halts forward motion of the tape. It should be noted that the playback speed of the capstan 187 is five times faster than normal playout or recording speeds enabling a high-speed transfer of the information located on the tape 161 to the transcription recorder.

Referring once again to FIG. 1 of the drawings, it has been described how audio information and digital information is generated at an author station 11 and recorded on a selected recorder 23. Additionally, it has been described how this information is read out to the transcription recorder 29. As will be described hereinafter, the transcription controller 31 is responsive to status signals at each transcriber station to determine whether the transcriber station is on or off line, has text to be transcribed, or is not busy. If the transcriber station 21 is not busy, the transcription controller effects a connection through the transcription switch 27 from a recorder 23 containing a text segment to the transcription recorder 29. The transcription switch 27 can be a conventional crossbar switch.

It has been found that fewer transcription recorders 29 are needed than recorders 23. This is because fewer transcribers are needed than the number of dictating authors. The transcription recorder 29 is similar to the recorder 23. That is, two stations are utilized, a first station to receive the input audio information from the recorder 23 at a high speed and a second station to allow the transcriber to play out the audio information at audio listening speeds. The second station incorporates controls enabling the operator to reverse the tape in the same manner as the author station described previously. Thus, only one complete segment at a time can be accessed by the transcribed. The transcription recorder 29 does not incorporate digital recording circuits since the digital information transferred from the recorder 23 is transferred directly to a digital buffer located in the transcriber station 21.

Figure 6:
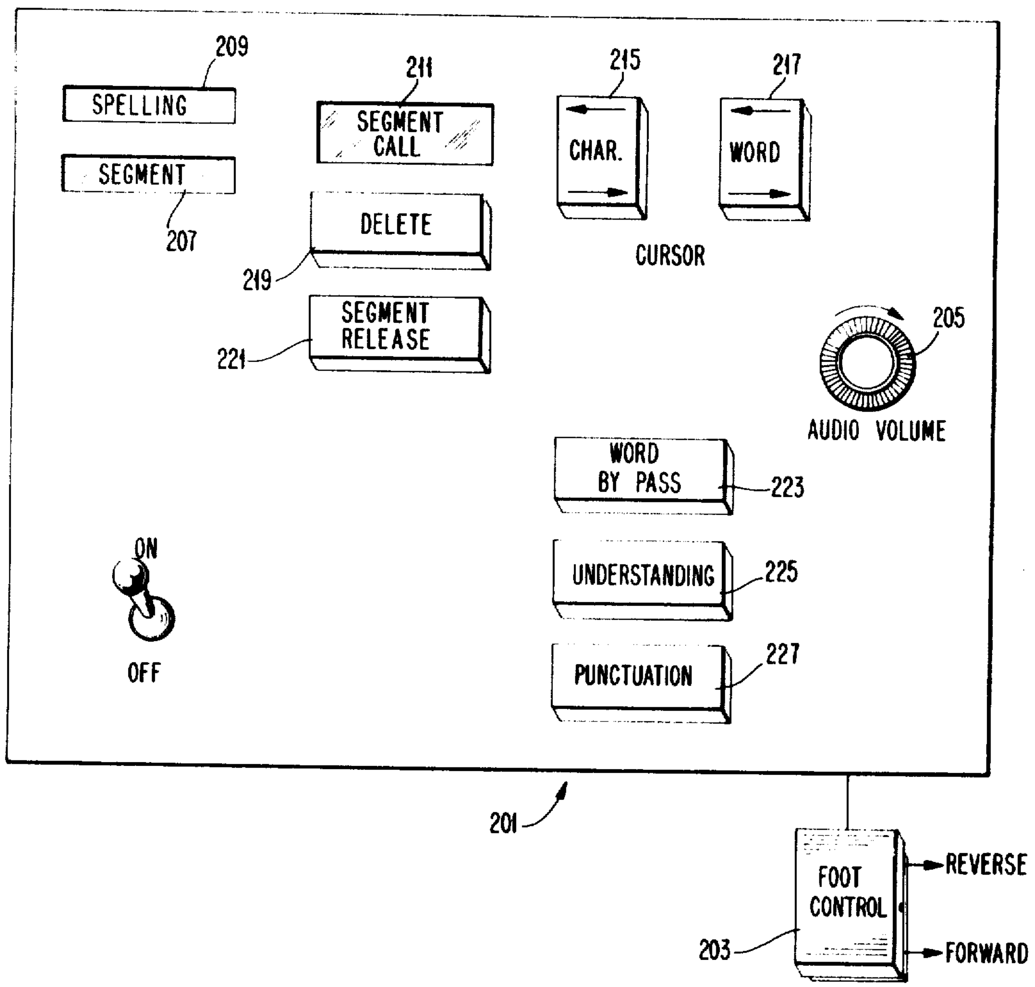
FIG. 6 is a pictorial illustration of a transcriber station.

The transcriber station 21 incorporates a conventional typewriter keyboard 33 as well as a special transcriber keyboard 201. Referring now to FIG. 6 of the drawings the transcriber keyboard 201 is depicted. Conventional foot controls 203 enable the operator-transcriber to generate command signals which cause the unit to play the audio tape out in a forward or listen mode or to back the tape up for subsequent audio review. An audio volume control 205 enables the operator to adjust the output audio sound level. A segment indicator 207 indicates to the operator that a segment has been transferred to the operator's transcription recorder for transcribing. A spelling indicator 209 indicates to the operator that a word will appear on her display screen which is obviously misspelled and needs correction. A segment call indicator 211 indicates to the operator that the system is experiencing a large backlog of segments to be recorded and that the operator should consider postponing any breaks or indicate to other close-by operators that they should go on line with the system. An on/off switch provides an indication to the system whether the transcriber operator is willing to accept additional text segments. When this switch is placed in an off position, the system no longer causes recorded segments to be transferred to that transcriber station. However, a previously transferred audio segment can be keyed and transmitted back to the system.

As has been described, a visual display of each keyed letter is presented to the operator through a CRT display. A visual cursor marking symbol is associated with this display and enables the operator to visually address a specific point in the transcribed text segment. The visual cursor is moved a character at a time or a word at a time under the control of keybuttons 215 and 217. Depression of the delete key 219 causes the character addressed by and adjacent to the cursor to be deleted and replaced with a blank. The remaining text characters on the display are line shifted left to close over the blank. Additionally, depression of a letter keybutton will cause the display of a character corresponding to the depressed keybutton at the cursor location. Any character previously existing at the cursor location is removed. Thus, the transcriber is able to correct obvious errors in transcription prior to releasing the keyed information to the system.

Depression of the segment release key 221 effects the transfer of the keyed digital information along with corresponding digital instruction words from the transcriber station buffer storage unit to the storage unit of the transcription controller. Additionally, depression of the segment release keybutton 221 signals the system that the operator has completed a text segment and that the transcriber station is ready to receive a new text segment. The transcription controller prevents the transfer of more than three text segments to a transcriber station in order to assure prompt keying of the thus transferred segments. A segment which has been recorded on the transcriber recorder cannot be accessed by the transcriber until the previously recorded segment has been released to the transcription controller.

Depression of the word bypass key 223 effects the display at both the author station and the transcriber station of a special character indicating that the transcriber did not understand a word and therefore did not transcribe it. Depression of the understanding key 225 causes an additional special character to be generated adjacent a transcribed word indicating that the transcriber was not sure of the word transcribed. Depression of the punctuation key 227 indicates that the transcriber was not sure of the punctuation key depressed and causes a special symbol to be generated adjacent to the punctuation mark. These special characters serve to call the author's attention to potential or actual errors in transcribing.

Figure 7:
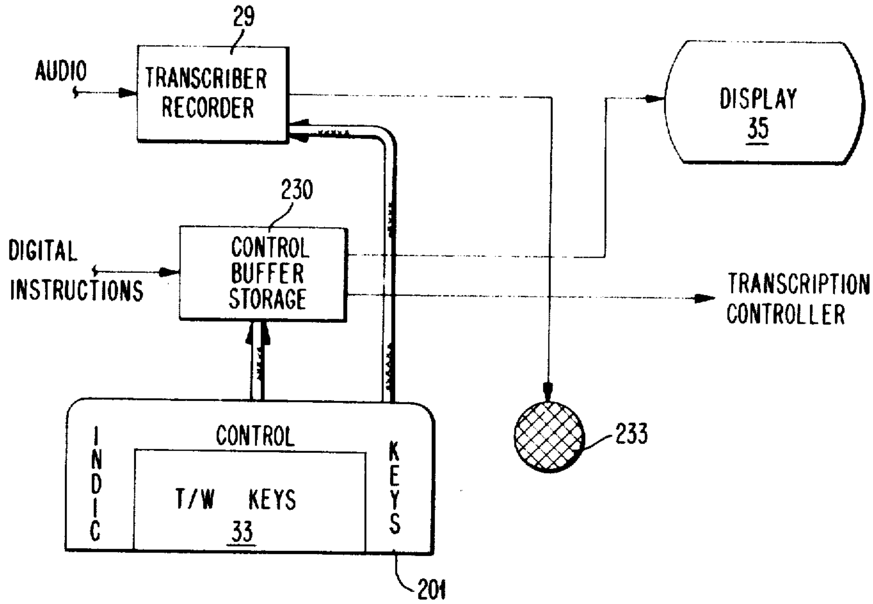
FIG. 7 is a block diagram of the transcriber station.

Referring now to FIG. 7 of the drawings, a block diagram of the transcriber station is depicted. As has been discussed, audio text segments are transferred from the author recorder to the transcriber recorder 29. The parallel digital signals recorded on the author recorder are simultaneously transferred to a control buffer storage 230. These digital signals identify the author station associated with the audio text transferred as well as a sequence number indicating the sequence of the audio text segment with previously and subsequently dictated audio segments. Three special registers exist in the control buffer storage to contain the digital information associated with the three segments which may be transferred to the transcriber recorder. As a text segment is released from the transcriber station to the transcription controller, the associated digital control information is also transferred and the digital control information associated with the next text segment is shifted to the thus-vacated storage position. As has been described, the digital instruction is recorded on a tape track at the author recorder which is parallel to the audio track. As will be described, the digital instruction comprises a plurality of information bytes including a start byte which follow one another on the recorded track. A stop byte follows the other instruction bytes a variable interval later as determined by the length of the audio segment. These digital instructions bytes may be recorded in a self-clocking manner or gated with timing signals permanently located on the recording tape medium. In either instance, the information signals themself or the timing signals are utilized to gate the recorded signals to the buffer storage 230 in a conventional manner.

Actuation of the control keys 201 can effect motion of the recorder tape with respect to the transcriber transducer thereby effecting audio playout. The audio playout is transmitted to the transcriber through the speaker 233. The transcriber then keys the information on the typewriter keyboard 33. The depression of a letter keybutton effects the transfer of signals from the keyboard to the buffer storage 230 in a conventional manner. A plurality of the last characters keyed at the typewriter keyboard are displayed on the display screen 35. The display device could be an IBM 2265 display unit while the control buffer storage 230 could be a modified IBM 2845 control unit. The modification would include addition of storage to facilitate the storage and shifting of digital instructions from the author recorder. Once the transcriber is satisfied with the keyed information, the segment release key is depressed effecting a transfer of the keyed transcribed text information and the control information associated with the transcribed segment to the transcription controller 31 of FIG. 1.

Referring once again to FIG. 1 of the drawings, the transcription controller 31 is responsive to digital signals generated at each author station 11, digital signals transduced by the recorders 23, and digital signals transmitted by the transcriber station 21. The function of the transcription controller 31 is to ensure the provision of a steady flow of information from the recorders 23 to the transcription recorders 29 and to keep track of the amount of information in the system to provide feedback signals to the author indicators. The transcription controller also assigns the sequence of transcription of each segment in accordance with a defined priority and ensures the proper sequence and author identification of transcribed text to the system storage and control unit 37 thereby facilitating proper placement of newly keyed text.

Figure 8:
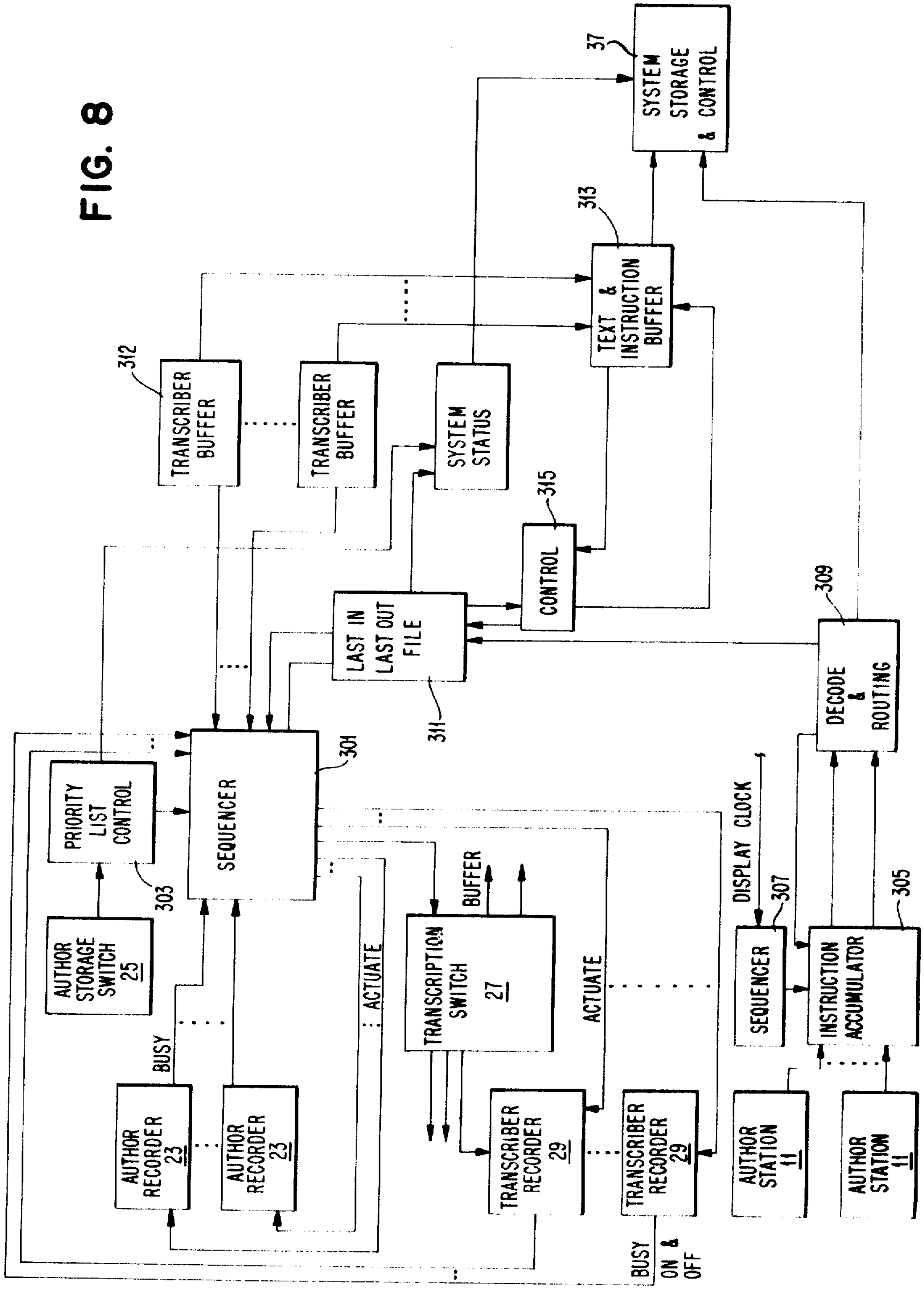
FIG. 8 is a block diagram of the transcription controller.

Referring now to FIG. 8 of the drawings, a block diagram of the transcription controller 31 of FIG. 1 is depicted. A sequencer 301 functions to connect an author recorder 23 to a transcriber recorder 29 through the transcription switch 27 in accordance with a predetermined priority. For example, one or more author stations may have a priority over all other author stations due to the importance of that particular author. Accordingly, anything dictated at that author station would be transcribed prior to information previously dictated at other author stations. The author storage switch 25 supplies information to the priority list control unit 303 which defines which recorder is associated with which author station. The priority list control unit 303 is programmed with a priority hierarchy which determines the order of transcription.

As the author dictates segments of text to be either inserted or added to the end of existing text, he depresses various controls heretofore described which initiate the transmission of a digital signal from that author station 11 to the transcription controller, the signal being serial by bit and serial by byte. A plurality of such digital signals are accumulated for each author station 11 in the instruction accumulator registers 305 until a complete instruction for a particular author station is accumulated. The display clock gates a sequencer unit 307 which in turn controls the clocking of the bytes of digital signals from the various author stations into the instruction accumulator registers 305. The operation and clocking of these registers will be described hereinafter.

Once a complete instruction is accumulated, it is gated to the decode and routing unit 309 which determines whether a text entry instruction has been generated or whether a text modification instruction has been generated. If a text entry instruction is specified, the author station number, text segment sequence number and page identification factors are transmitted to the last in last out file 311. Those instructions relating to text modification operations are routed directly to the system storage and control unit 37. Insertion instructions which form a part of a text entry command are routed both to the last in last out file 311 and to the system storage and control unit 37 as will be described hereinafter.

The last in last out file 311 thus contains a stored sequence listing of digital text segment identification information identifying text which has been dictated and, as will be explained, not yet transcribed. When a transcribe recorder is available, the sequencer 301 scans the file 311 and determines whether an author having first priority as defined by the priority list control unit 303 has dictated text. If such an author has dictated text, the author recorder 23 associated with that author station is actuated by the sequencer. Additionally, the available transcriber recorder 29 and its corresponding transcriber buffer 312 are respectively actuated to receive audio signals and digital instructions from the actuated author recorder and the transcription switch 27 is actuated to define a path from the actuated author recorder 23 to the actuated transcriber recorder 29 and associated transcriber buffer 312. If no author having priority has dictated a segment, then the first segment in the last-in last-out file is selected and the corresponding author recorder 23 and available transcriber recorder 29 and transcriber buffer 312 are actuated. The sequencer 301 only effects the transfer of information from the author recorder to the transcription recorder when a transcription recorder is available. Lines connecting the transcriber station to the sequencer indicate whether the transcriber recorders are full and in an on condition. Additionally, each author recorder provides a feedback signal to the sequencer which indicates whether the recorder is in a transfer mode to another transcriber station and therefore not available to be selected at that moment. When a segment is selected for transfer and when the transfer connection is made, a flag bit is stored in the last-in last-out file 311 preventing further access to the stored instruction by the sequencer 301.

Once information has been keyed at the transcriber station and the operator depresses the segment release keybutton, information located in the buffer of the transcriber unit is transferred to the text and instruction buffer 313. Additionally, a signal is provided from each transcriber buffer to the sequencer indicating that a transfer has been completed and that the transcriber can thereafter accept another text segment. Once a transcribed segment of text and its corresponding author identification and instruction information is located in the text and instruction buffer 313, the control unit 315 checks to determine if that is the earliest sequential text segment of that particular author that has been dictated. The control unit 315 is thus responsive to the last-in last-out file 311 and to the control information in the text and instruction buffer to make such a determination. If an earlier dictated segment is still located in the last-in last-out file, control unit 315 inhibits the transfer of the information in the text and instruction buffer 313 to the system storage and control unit 37. If the information in the text and instruction buffer represents the earliest dictated segment of an author, it is then gated by the control unit 315 from the text and instruction buffer 313 to the system storage and control unit 37. Additionally, the control unit 315 effects the removal of the flagged instruction from the last-in last-out file. Accordingly, information transmitted from the text and instruction buffer 313 is always in proper sequence order for each author.

Figure 9:
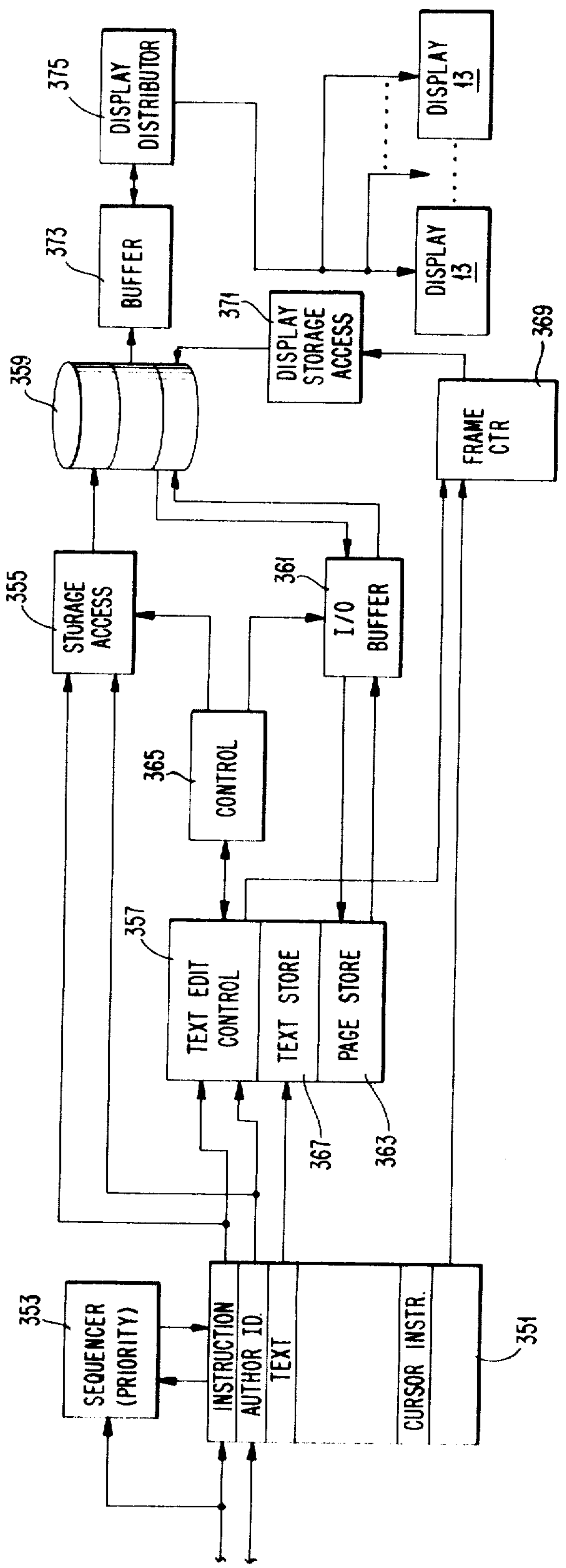
FIG. 9 is a block diagram of the system storage and control unit and the display controller.

Referring now to FIG. 9 of the drawings a block diagram of the system storage and control unit 37 and display controller 39 is depicted. As has been described, text entry instructions (e.g., insert or dictate), containing author identification information including the author station number, page number, segment sequence number, display cursor address and the text to be added are transferred from the transcription controller to the system storage and control unit. These instructions are sequentially stored in the instruction and text registers 351. Additionally, text modification instructions containing no text to be added are routed directly to the instruction registers 351 for sequential storage. A priority sequencing device 353 effects the execution of each text modification instruction in the sequential order in which it was received, all text modification instructions being of higher priority than text entry instructions. Thus after all stored text modification instructions have been performed, the sequencing device 353 then insures the execution of the text entry instructions in the sequence in which they were received. If, for example, a text modification instruction is received, the sequencer 353 effects the gating of that instruction and the corresponding author identification information to the storage access unit 355. Additionally, the instruction and author identification information is transferred to the text edit and control unit 357. The storage access unit 355 effects the access of the specified page in accordance with the author identification information from the bulk storage unit 359 and effects its transfer to the input-output buffer 361. The accessed page of text information is then transferred from the input-output buffer 361 to the page store 363. Control 365 is responsive to the text edit control unit 357 to properly sequence the transfer of information from the input-output buffer 361 to the page store 363.

The operation of the text edit control 357 in conjunction with the page store 363 is described in detail in the aforereferenced copending applications of Paul E. Goldsberry et al. and Robert G. Bluethman et al. These units perform the text modification operations such as text deletion, text rearrangement and reformatting to preexisting stored text formats. Once the text modification specified by the instruction has been completed, the control 365 effects the transfer of the thus modified text from the page store 363 to the input-output buffer 361 and then back to its allocated position in the bulk storage unit 359.

When a text entry dictate instruction has been received, the instruction and author identification information is again routed to the storage access unit 355 which accesses the specified page. Additionally, the instruction and author identification information is also transmitted to the text edit control 357 and the transcribed data text is transferred to the text store unit 367. The information in the text store 367 is added at the end of the information in page store 363 and the operation proceeds as before.

When a text entry insert command has been received, the text information is entered at a predefined point in the preexisting text within the page store. The thus inserted information causes the remaining information to shift to the right and down page in the page store unit 363. If a page overflow occurs, the first page of information is transferred to the I/O buffer 361 for restorage in the bulk storage unit 359, the overflow information is transferred to the topmost portion of the page store unit 363 and the next page of information is transferred from the bulk storage unit 359 to the page store 363. This operation continues until the last page of a document is generated.

As mentioned above, an insert operation causes text to be placed at a predefined point in a stored page of information. It will be recalled that insert instructions are routed immediately through the transcription controller to the instruction and text registers 351. When such an insert instruction without accompanying text is received and executed, the author segment number associated with the insert command is caused to be inserted at the location defined by the cursor address in the page of text accessed in accordance with the author identification information. That is, the insert instruction effects the routing of the specified page from the bulk storage 359 to the page store 363 in the manner described above. The cursor location accompanying the author identification information specifies the point at which an entry will be made. The entry effected is the text segment number. The thus updated text containing a segment number is then stored back in the bulk storage unit 359. When the same instruction later arrives from the transcription controller with the transcribed text, the segment number is utilized in lieu of the cursor address to ensure a proper placement of the inserted text. The segment number is automatically deleted upon text entry and the inserted text is entered at the thus vacated text location. In this manner, multiple insertions may be specified by the author at the author station prior to the execution of the first such instruction. The segment number thus replaces the cursor location information as described in the aforereferenced applications.

When a dictate command is specified, the cursor is automatically placed adjacent the last text character of the document accessed. Subsequently dictated segments have no effect on the placement of the cursor symbol which remains in its position until moved by the author. The cursor location specifies the lines displayed within a display frame. Assuming a display frame of twelve lines of text, placement of the cursor adjacent the 24th line of a page would effect the display of lines 13 through 24. Subsequent movement of the cursor down page effects a frame change. Frame counter 369 is responsive to the cursor instructions located in the cursor instruction register 351 to provide a signal to the display storage access unit 371 to effect gating out to the display buffer 373 of the desired frame as specified by the cursor location. Whenever the text edit control unit 357 operates on text located within the frame displayed as defined by the cursor address, the text edit control unit 357 transmits a signal to the frame counter 369 effecting the access of the thus updated text information for a subsequent transfer to the display buffer 373. The output of the display buffer 373 is transmitted to the display distributor 375 which contains a refresh buffer for each display. This buffer could be similar to that of the IBM 2845 display control, it being understood that it is necessary to provide an independent storage unit for each associated display. The output of the display buffer is then transferred to the display units 13 at the author stations 11. As described heretofore, these units could be similar to the IBM 2265 display units.

Referring once again to FIG. 1 of the drawings, the logical components which make up each of the blocks shown in FIG. 1 have been described. Additionally, the information flow paths of the audio and digital signals generated at each author station 11 have also been described. The audio signals are transduced, recorded, transmitted, and retransduced in a conventional manner that will not be further described. In the description immediately following, the unique combinations of digital signals which are generated at the author station and which facilitate system operation will be described. There are basically two types of instructions: text modification instructions and text entry instructions. As has been described, text entry instructions are routed within the transcription controller 31 to ensure the efficient utilization of each of the transcription stations 21 as well as to ensure the proper placement of the keyed text information. Text modification instructions are routed through the transcription controller 31 to the system storage and control units 37 for immediate execution. Once an instruction has been executed and the resultant text thus updated, the information appearing on the display screen 13 may be modified in accordance with the thus updated text.

As will be described hereinafter, the system is dependent upon the output of the display controller 39 for timing signals. These timing signals are utilized to link the various operating units of the system to one another. When the author depresses a control key initiating a text modification or text entry instruction, bytes of information are generated at the author station 11 and transmitted over the digital line paths in the manner heretofore described. Each such byte is clocked with the output of the display controller and is transferred during a display frame. Each instruction byte contains eight bits of information, each such bit of information being generated during horizontal traces of the CRT beam. Since a 12-line display frame has been assumed, the eight information bits along with sync bits at the leading and trailing edges of the information bits are generated during ten of the horizontal trace times of a horizontal display frame. Each instruction is made up of a plurality of bytes, each such instruction starting with a sync byte and terminating with a sync byte. The number of useful bytes required by an instruction is dependent upon the complexity of the instruction. Table I below lists the byte sequence for an insertion instruction.

TABLE I

Text Insertion Instruction

| | |
|---|---|
| Sync Byte | Start Instruction |
| Instruction Byte | Text Insertion |
| Station No. | Author Station Identification |
| Document No. | Document Identification |
| Page Displayed | Document Identification |
| Cursor Line Address | |
| Cursor Position in Line Address | |
| Segment No. | Units and Tens |
| Segment No. | Hundreds |
| Sync Byte | End of Instruction |

It will be noted that the sync byte is followed by an instruction byte indicating that an insertion operation is to be performed by the system. Thereafter a station number byte indicating the specific author station generating the instruction follows. A document number byte then identifies the document on which the author is working and the units and tens page number bytes identify the page of the document on which the author is working. The cursor line address is transmitted as well as the cursor horizontal position to indicate the point at which the insertion is to be made. The output of the segment number counter at the author station is then utilized to identify a segment number. This segment number corresponds to the segment number which is inserted in the text storage and subsequently replaced by the transcribed dictated text. Assuming that a display frame lasts one-sixtieth of a second, the first nine instruction bytes of an insertion instruction are transmitted within approximately nine-sixtieths of a second after depression of the insertion key. During this time interval, a tone is generated at the author station as has been described to insure that the tone and voice actuated recorder 23 records the instruction. Thereafter, the author dictates the matter to be inserted into the transducer 19. This audio information is recorded on the voice-actuated recorder 23 as has been described heretofore. Depression of the segment key at the completion of dictation effects the generation of a sync byte indicating the end of the instruction. It should be noted that the sync bytes at the beginning and ending of the various instructions are unique bytes and are recognized by the system as a start instruction and stop instruction command.

As has been described, prior to the depression of the segment key thereby terminating the operation, the author has the option to listen to and record over previously dictated material. Should the author decide to review previously dictated material, the review keybutton is depressed and the recorder 23 effects the movement of recording tape in the reverse direction until the start sync byte is detected in reverse. Subsequent depression of the listen key effects no change and no new command is generated. However, subsequent depression of the talk or record key effects the regeneration of the insertion instruction thereby ensuring that a complete instruction is recorded on the media of the recorder 23. The newly generated instruction is recorded over the previously generated instruction and also superimposed in the instruction accumulator register 305 of FIG. 8 as will be described hereinafter. Depressing the segment key prior to dictating audio information causes the stop sync byte not to be generated. That is, the author station is responsive to a voice actuation circuit to inhibit the generation of an insertion instruction. This circuit is reset upon review by the author and again set upon playout.

Table II illustrates a dictate instruction. This instruction is of the same format type as the insert instruction and includes the sync bytes which start and end the instruction and the station identification information necessary for proper instruction execution. It should be noted that although the cursor line address and line position is not utilized to effect the execution of the dictate instruction, it is transmitted so that this instruction has the same format as the insert instruction.

TABLE II

Dictate Instruction

| | |
|---|---|
| Sync Byte | |
| Instruction Byte | Dictation |
| Station No. | Author Station Identification |
| Document No. | Document Identification |
| Page Displayed | |
| Cursor Line Address | |
| Cursor Position in Line Address | |
| Segment No. | Units and Tens |
| Segment No. | Hundreds |
| Sync Byte | End of Instruction |

Tables III–X illustrate various text modification instructions.

TABLE III

Frame Move Instruction

| | |
|---|---|
| Sync Byte | |
| Instruction Byte | Higher or Lower Frame |
| Station No. | Author Station Identification |
| Document No. | Author Document Identification |

| | |
|---|---|
| Page Displayed | |
| Cursor Line Address | |
| Cursor Position in Line Address | |
| Open | Blank |
| Open | Blank |
| Sync Byte | End of Instruction |

TABLE IV

Delete Instruction

| | |
|---|---|
| Sync Byte | |
| Instruction Byte | First Set of Delete Instruction |
| Station No. | Author Station Identification |
| Document No. | Document Identification |
| Page Displayed | |
| Cursor Line Address | |
| Cursor Position in Line Address | |
| Text Positioning Code | Tab, Paragraph, or Eol. |
| Punctuation | Symbols |
| Sync Byte | End of Instruction |

TABLE V

Delete Instruction

| | |
|---|---|
| Sync Byte | |
| Instruction Byte | Second Set of Delete Instruction |
| Station No. | Author Station Identification |
| Document No. | Document Identification |
| Page Displayed | |
| Cursor Line Address | |
| Cursor Position in Line Address | |
| Open | Blank |
| Open | Blank |
| Sync Byte | End of Instruction |

TABLE VI

Move Instruction

| | |
|---|---|
| Sync Byte | |
| Instruction Byte | Move Paragraph of Text |
| Station No. | Author Station Identification |
| Document No. | Document Identification |
| Page Displayed | |
| Cursor Line Address | |
| Cursor Position in Line Address | |
| Open | Blank |
| Move Direction | Up or Down |
| Sync Byte | End of Instruction |

TABLE VII

Page Call Instruction

| | |
|---|---|
| Sync Byte | |
| Instruction Byte | Call for New Page |
| Station No. | Author Station Identification |
| Document No. | Document Identification |
| Page Displayed | |
| Cursor Line Address | |
| Cursor Position in Line Address | |
| Open | Blank |
| New Page No. | |
| Sync Byte | End of Instruction |

TABLE VIII

Document Call Instruction

| | |
|---|---|
| Sync Byte | |
| Instruction Byte | Call for New Document |
| Station No. | Author Station Identification |
| Document No. | Document Identification |
| Page Displayed | |
| Cursor Line Address | |
| Cursor Position in Line Address | |
| Open | Blank |
| New Document No. | |
| Sync Byte | End of Instruction |

TABLE IX

Format Call Instruction

| | |
|---|---|
| Sync Byte | |
| Instruction Byte | Format Call |
| Station No. | Author Station Identification |
| Document No. | Document Identification |
| Page Displayed | |
| Cursor Line Address | |
| Cursor Position in Line Address | |
| Open | Blank |
| Format No. | Identification |
| Sync Byte | End of Instruction |

TABLE X

Format Instruction

| | |
|---|---|
| Sync Byte | |
| Instruction Byte | Format Text |
| Station No. | Author Station Identification |
| Document No. | Document Identification |
| Page Displayed | |
| Cursor Line Address | |
| Cursor Position in Line Address | |
| Open | Blank |
| Section | Paragraph or Page |
| Sync Byte | End of Instruction |

The frame move instruction of Table III starts with the same sync byte configuration as the text entry instructions previously described and ends with the same sync byte configuration. The instruction byte specifies that a frame move operation is to be executed. This operation is initiated whenever the cursor is moved down page past the last displayed line or up page past the first displayed line. The station and document designation, along with the page displayed and the cursor line address are utilized to identify the display frame currently displayed to the system so that the system can compute the next display frame.

The delete instruction of Tables IV and V are effected when the operator specifies a delete text operation. The delete operation is accomplished by the operator placing the cursor adjacent the first character to be deleted, depressing a delete key and thereafter moving the cursor horizontally and/or vertically down page over the characters which are displayed and which are to be deleted. Cessation of the cursor motion along with the release of the delete key generates the second delete instruction of Table V. The first delete instruction is transmitted upon depression of the delete key. The system storage and control unit 37 is responsive to the first delete instruction to effect its placement in storage. Upon receipt of the second delete instruction by the system storage and control unit 37, the delete instructions are executed. A frame move instruction may be generated and executed intermediate the generation of the two delete instructions.

The initiation of a paragraph move instruction causes a paragraph of text to be moved up page by one complete paragraph or down page by one complete paragraph thereby interchanging the specified paragraph with the paragraph immediately above or below it. Depression of the move paragraph key effects the generation of the instruction bytes illustrated in Table VI. The operation of the system in response to a paragraph move instruction is fully described in the aforereferenced copending applications of Robert G. Bluethman et al.

The page call and document call instructions illustrated in Tables VII and VIII, respectively, are initiated by operator depression of a page call or document call keybutton. The page or document number is subsequently generated upon operator depression of the numerical keys on the keyboard 57 of FIG. 2. Two such key depressions are required for each document or page specified.

Tables IX and X illustrate the format call instruction and the format instruction, respectively. The format call instruction causes the display of a given format on the display screen 13. This instruction is initiated by depressing the format call keybutton and thereafter specifying the format number desired for visual review. The author is thus able to see various left and right margins which the text could conform to. The operation of displaying the left and right margins of different prestored formats is described in the aforereferenced copending applications of Paul E. Goldsberry et al. and Robert G. Bluethman et al. The format keybutton specifies the format to the system which will be utilized by the system for the page display and all subsequent pages dictated of that particular document. The operation of specifying a predefined format is described in the aforereferenced copending applications.

TABLE XI

Edit Insertion Instruction

| | |
|---|---|
| Sync Byte | |
| Instruction Byte | Edit Insertion |
| Station No. | Author Station Identification |
| Document No. | Document Identification |
| Page Displayed | |
| Cursor Line Address | |
| Cursor Position in Line Address | |
| Text Positioning Code | Tab, Paragraph, or Eol |
| Punctuation | Symbols |
| Sync Byte | End of Instruction |

Table XI illustrates a punctuation instruction. This instruction is very similar to an insertion instruction except that a particular punctuation byte placed in the data stream in lieu of the segment number identification. Since a punctuation insert instruction has been specified in lieu of an insert instruction, the punctuation byte is placed directly in the data stream as has been described heretofore with respect to the segment number of an insert instruction and the instruction is routed directly through the transcription controller to the system storage and control unit. Paragraph defination, line ending defination or tab commands can be inserted in the same manner.

TABLE XII

Spelling Instruction

| | |
|---|---|
| Sync Byte | |
| Instruction Byte | Spelling |
| Station No. | Author Station Identification |
| Document No. | Document Identification |
| Page Displayed | |
| Cursor Line Address | |
| Cursor Position in Line Address | |
| Open | Blank |
| Open | Blank |
| Sync Byte | End of Instruction |

Table XII illustrates the instruction transmitted when the author desires to highlight a particular word by causing that word, which may be obviously misspelled, to appear at a transcription station for correction. This instruction identifies the word addressed by the cursor location and is transmitted on operator depression of the spelling key 73 of FIG. 2.

In the description immediately preceding, the various digital instructions generated at each author station 11 have been described. In the description immediately following, the system response to these various generated instructions will be described. It should be noted that the flow of the digital instructions will be described without reference to their corresponding audio signals for purposes of clarity.

Figure 10:
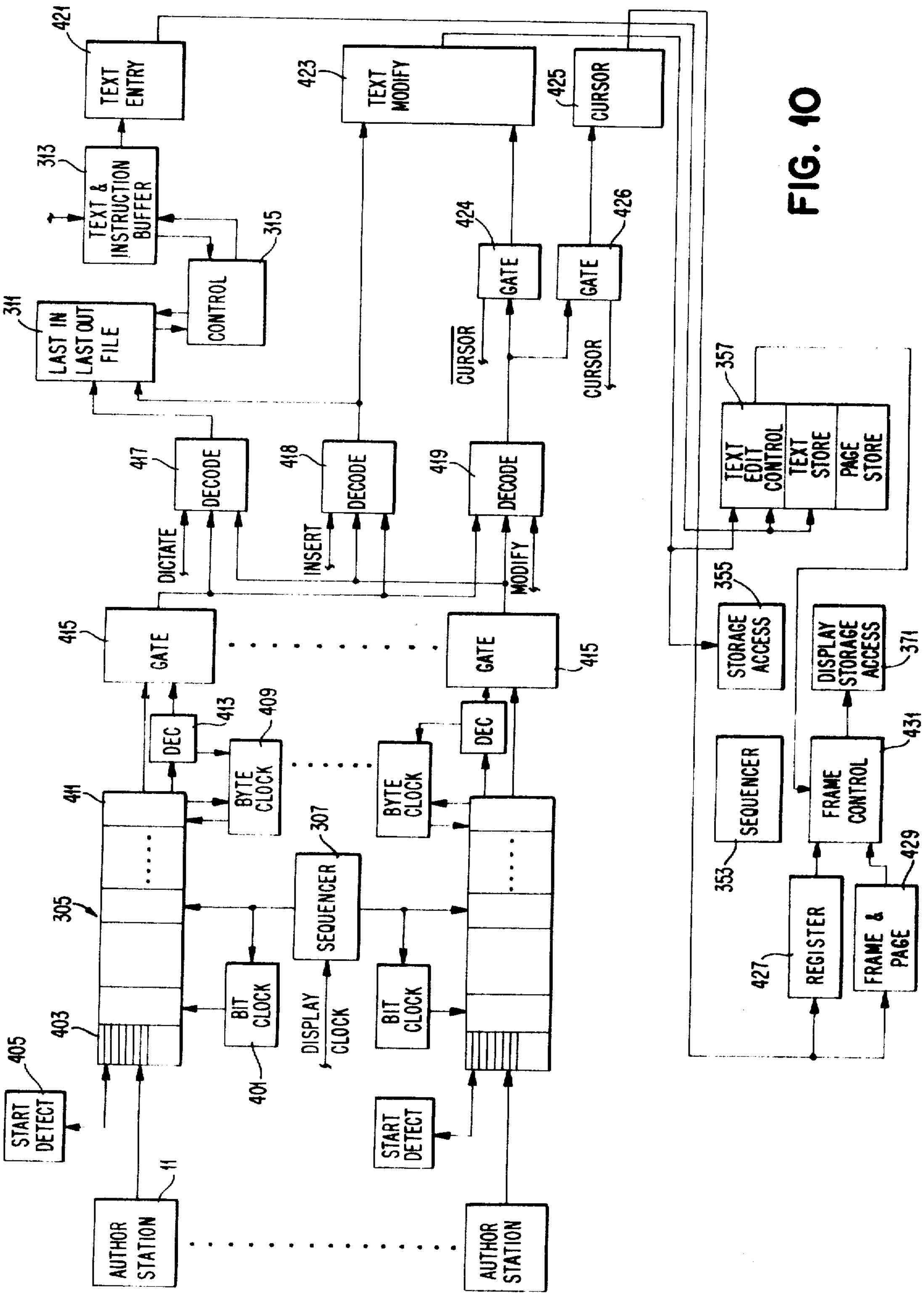
FIG. 10 is a block diagram of units responsive to digital instructions.

Referring now to FIG. 10 of the drawings, a block diagram depicting the various functional units responsive to the command instructions generated at the author stations is depicted. It will be recalled that each author station 11 has an instruction accumulate register 305 located at the transcription controller associated therewith. Each such register is responsive to the sequencer 307 which in turn is responsive to clocking signals generated by the display distributor. The generation of these clocking signals and their relation to the display frame will be described in detail hereinafter. The sequencer 307 generates a plurality of signals which drive a bit clock 401 associated with each register byte position. The bit clock advances through each bit position of each byte of information in the instruction. Assuming that the generation of an instruction has just been initiated, the first byte position 403 of the corresponding register is gated with the bit clock 401 until each bit position is gated. Assuming that a valid start byte is thus received, start byte detect 405 provides a signal to its corresponding byte clock 409 which advances by one byte position. Thereafter, the bit clock 401 is operative to gate bits of information into the second byte position of the register and so on until the tenth byte position 411 is filled. A decode 413 insures the receipt of the stop byte in the last byte position and provides a gate signal to the corresponding gating circuit 415. Additionally, the decode circuit 413 resets the byte clock 409 once the instruction is transferred so that a subsequent instruction may be received. The decode of a start byte at the last byte position 411 of the registered 305 causes the byte clock to be reset by the decode 413 to the second position of the register. Actuation of each gating circuit 415 allows the information in the corresponding accumulate register 305 to be transferred to one of the decode circuits 417–419, it being understood that only one such gate 415 can be actuated at any time interval. The decode circuits 417–419 are responsive to the instruction byte of the instruction to determine whether the instruction is a dictate instruction, an insert instruction, or a text modify instruction. Dictate and insert instructions are routed to the last-in last-out file 311. At a later point in time, the instruction along with the text is transmitted from the transcriber station to the text and instruction buffer 313. Control 315 is responsive to the last-in last-out file 311 and to the instructions located in the text and instruction buffer 313 to provide a gating signal gating the instruction and its corresponding text from the buffer 313 to the text entry instruction register 421 of the instruction register 351 of FIG. 9. Insertion instructions are routed from the decode 418 to the text modify register 423 of the instruction register. Additionally, text modification instructions are routed from the decode 419 to either the text modify register 423 or the cursor register 425 in accordance with the type of operation specified as decoded by the gates 424 and 426. That is, when an operation specifying a frame change, a page change, or a document call is received, it is routed through the gate 426 directly to the cursor register 425 which forms a portion of the instruction register 351 of FIG. 9.

As has been described, sequencer unit 353 gates the scored text modification instructions from the text modification register 423 to the storage access unit 355 and the text edit control unit 357. Once the text modification register 423 is deplete of instructions, the sequencer then gates the text entry instructions located in the text entry register 421 on a last-in last-out basis. The instructions are transmitted to the storage access unit 355 and the text edit control unit 357. Additionally, corresponding keyed text is transmitted to the text store. The text edit and control unit 357 preforms the text modification and text entry instructions specified with the specified text and thereafter causes the thus updated text to be stored for subsequent display.

Cursor instructions calling for a frame move, page change or a new document are routed to the cursor register 425. The sequencer 353 effects the gating out of these instructions on a last-in last-out basis and operates this gating in parallel with the gating of instructions from the text modification and text entry registers. The addressing information is gated into the author address register 427 and the type of modification, for example, a frame down change, a frame up change, or a page change is transmitted to the frame and page instruction resiter 429. The frame cpntrol unit 43 responsive to the frame and page instruction register 429 and the author address register 427 to specify the storage address of the lines to be displayed. This unit is also responsive the text edit control unit 357 which specifies frame changes for certain text modification and entry instructions. The output of the frame control unit 431 is provided to the display storage access unit 371 which effects the access of the desired lines to be displayed.

In the discussion immediately following, the display clock and the generation of the various digital signals at the author stations will be described. These digital signals are encoded into the instructions which have been described in the section immediately preceding.

Figure 11:
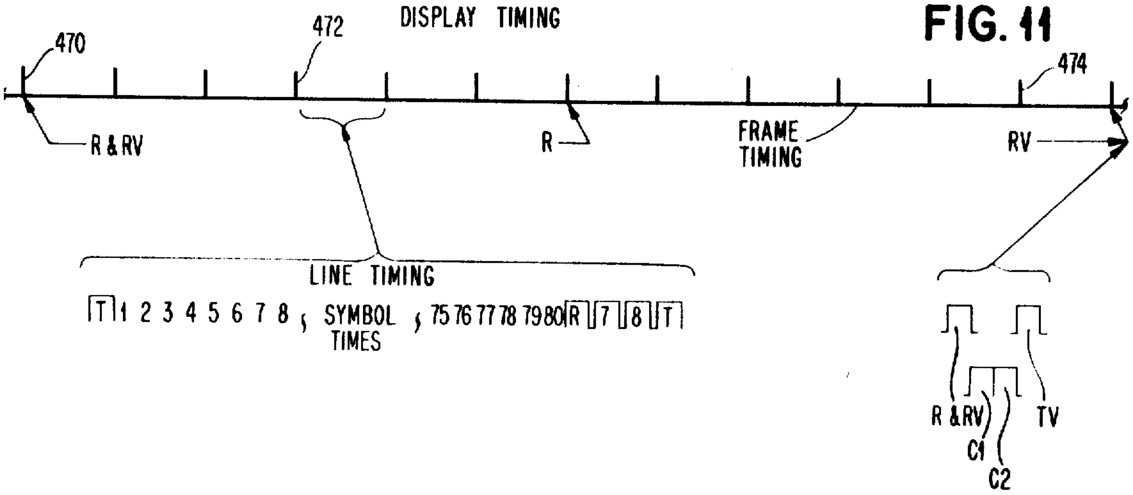
FIG. 11 is a timing diagram of the display clock.

Referring now to FIG. 11 of the drawings, a timing diagram of the display clock is depicted. Assuming the display of 60 frames per second and 12 lines of information per frame, the vertical and horizontal trace command signal 470 is followed by 11 horizontal retrace and trace signals 472 which in turn are followed by a vertical and horizontal retrace signals 474. Intermediate the 11 horizontal retrace and trace signals are located a plurality of symbol times and control times. Assuming an 80-character display line, 80 symbol times follow each trace command T and are in turn followed by a retrace command R. Intermediate the retrace command and the trace command for the next line are located two control byte times. Since there are 12 line trace and retrace bytes, there are 24 control byte times per display frame. The even-numbered control byte times are utilized to convey cursor line position information while the odd byte times are utilized to convey the various instruction bytes which are transmitted from the system display distributor 375 of FIG. 9. The first eight control bytes are utilized in conjunction with the generation of the instruction bytes while the last four even control bytes are utilized as timing signals to gate previously generated instructions to various operational units of the system. Information transfer of each instruction bit from an author station to a corresponding recording device or to the instruction accumulate register 305 of FIG. 10 is effected at line retrace times of the third through tenth line of a display frame while the transfer of information from the unit 305 to various other control units of the system is accomplished at times other than the third through tenth line times.

Table XIII lists the utilization by the system of the 24 display control bytes which occur within a display frame.

TABLE XIII

| Byte Number | Control Byte Assignment |
|---|---|
| 1 | Open |
| 2 | Line Number |
| 3 | Author Station No. |
| 4 | Line Number |
| 5 | Document No. |
| 6 | Line Number |
| 7 | Page Number |
| 8 | Line Number |
| 9 | Transcription Status |
| 10 | Line Number |
| 11 | Recorder Status |
| 12 | Line Number |
| 13 | Open |
| 14 | Line Number |
| 15 | Open |
| 16 | Line Number |
| 17 | Open |
| 18 | Line Number |
| 19 | Open |
| 20 | Line Number |
| 21 | Open |
| 22 | Line Number |
| 23 | Open |
| 24 | Line Number |

A sequence counter is responsive to the various system timing signals and to the condition of the author station to advance through a plurality of unique states, each state of which is utilized to effect the generation of an instruction byte of information. A total of 16 such sequences are uniquely specified by the sequence counter. Table XIV lists the various bytes of information which are generated during each unique sequence.

TABLE XIV

| | |
|---|---|
| Seq. 0 | Rest |
| 1 | Mechanism start dictate and verbal insert |
| 2 | Start sync byte |
| 3 | Instruction byte |
| 4 | Author station identification |
| 5 | Document identification |
| 6 | Page No. |
| 7 | Cursor line address |
| 8 | Cursor position in line address |
| 9 | Segment No. |
| 10 | Segment No. |
| 11 | Spare |
| 12 | Tab or paragraph or EOL |
| 13 | Punctuation |
| 14 | Segment delay control |
| 15 | End instruction byte |

Ten sequence times are used in gating instruction bytes to the digital control line leading from the author station. Sequence times 9 and 10 are used in text entry instructions only, and sequence time 13 for instructions other than text entry. Sequences 0, 1, 11, and 14 are control states which are not transmitted. Thus ten sequence times are used to gate the ten instruction bytes of an instruction, each byte being transmitted during a display frame. For example, the cursor line address information is generated for system utilization when the sequence counter advances to its 7 state. The start sync byte is generated when the sequence counter is in its two state and so on.

Figure 12:
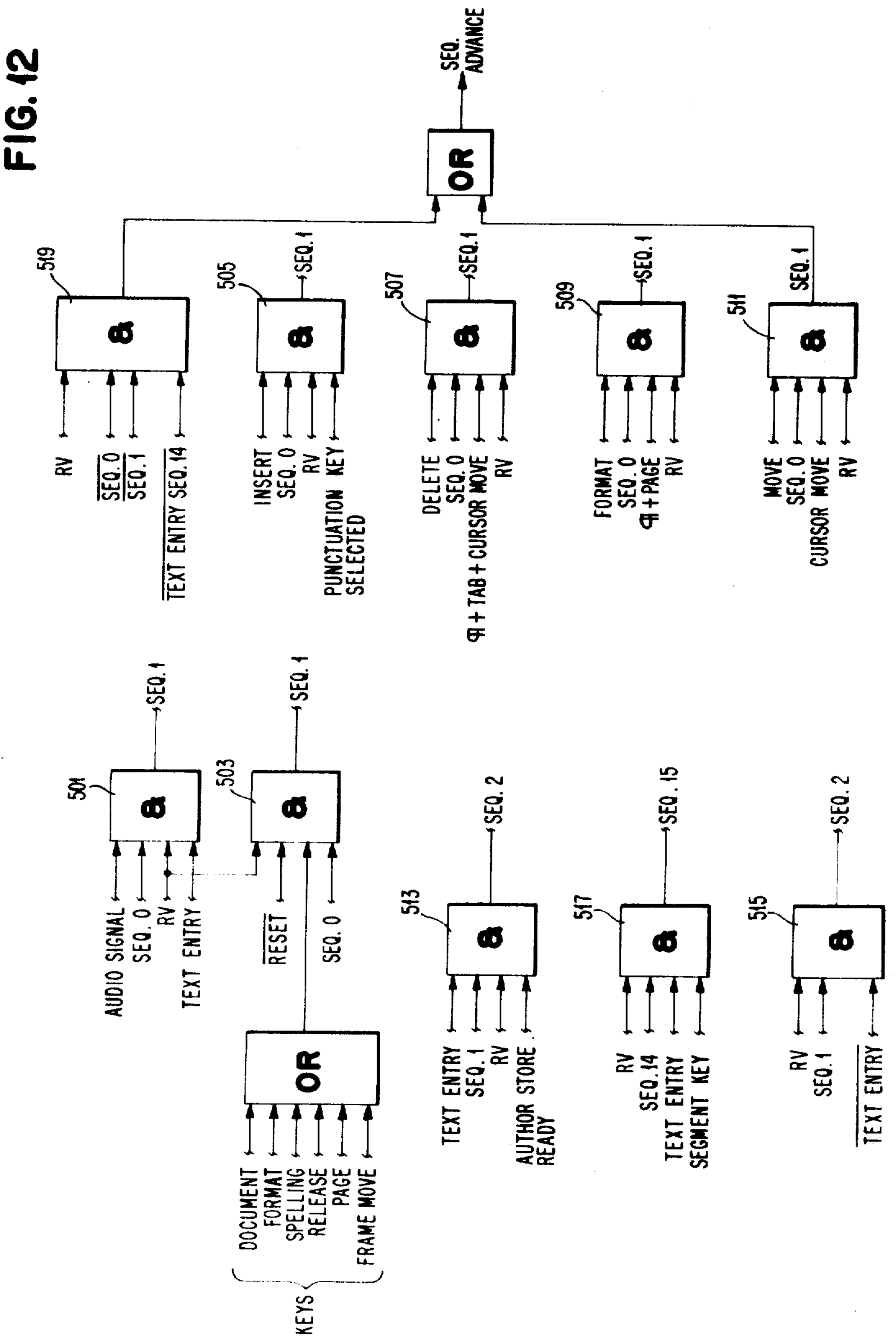
FIG. 12 is a block diagram of the gating circuits which cause the sequence counter to advance.

Referring now to FIG. 12 of the drawings, a block diagram of the gate circuits which cause the sequence counter to advance is depicted. Assuming that the sequence counter is in its zero or rest position, author depression of a control key such as the frame move key or the presence of an audio signal during a text entry operation causes the sequence counter to advance from its zero state to its one state through a signal provided by the gating circuits 501 and 503. Additionally, the gating circuits 505, 507, 509 and 511 cause the sequence counter to advance to its one state whenever a punctuation insertion operation is specified, a deletion operation is specified, a reformating operation is specified or a text move operation is specified, respectively. The sequence counter is advanced to its two state after reaching its one state during a text entry operation when the author storage device is in a ready status as controlled by the gating circuit 513. Additionally, during other operations other than text entry, the counter is advanced to its sequence two position immediately upon the occurrence of a vertical retrace signal as determined by gating circuit 515. Gating circuit 517 controls the advance of the sequence counter from its 14 state to its 15 state and thus prevents the end instruction byte from being generated during a text entry operation until the segment key is depressed. Gating circuit 519 controls the advance of the sequence counter during all other conditions other than those previously specified, the counter advancing with each vertical retrace pulse.

Figure 13:
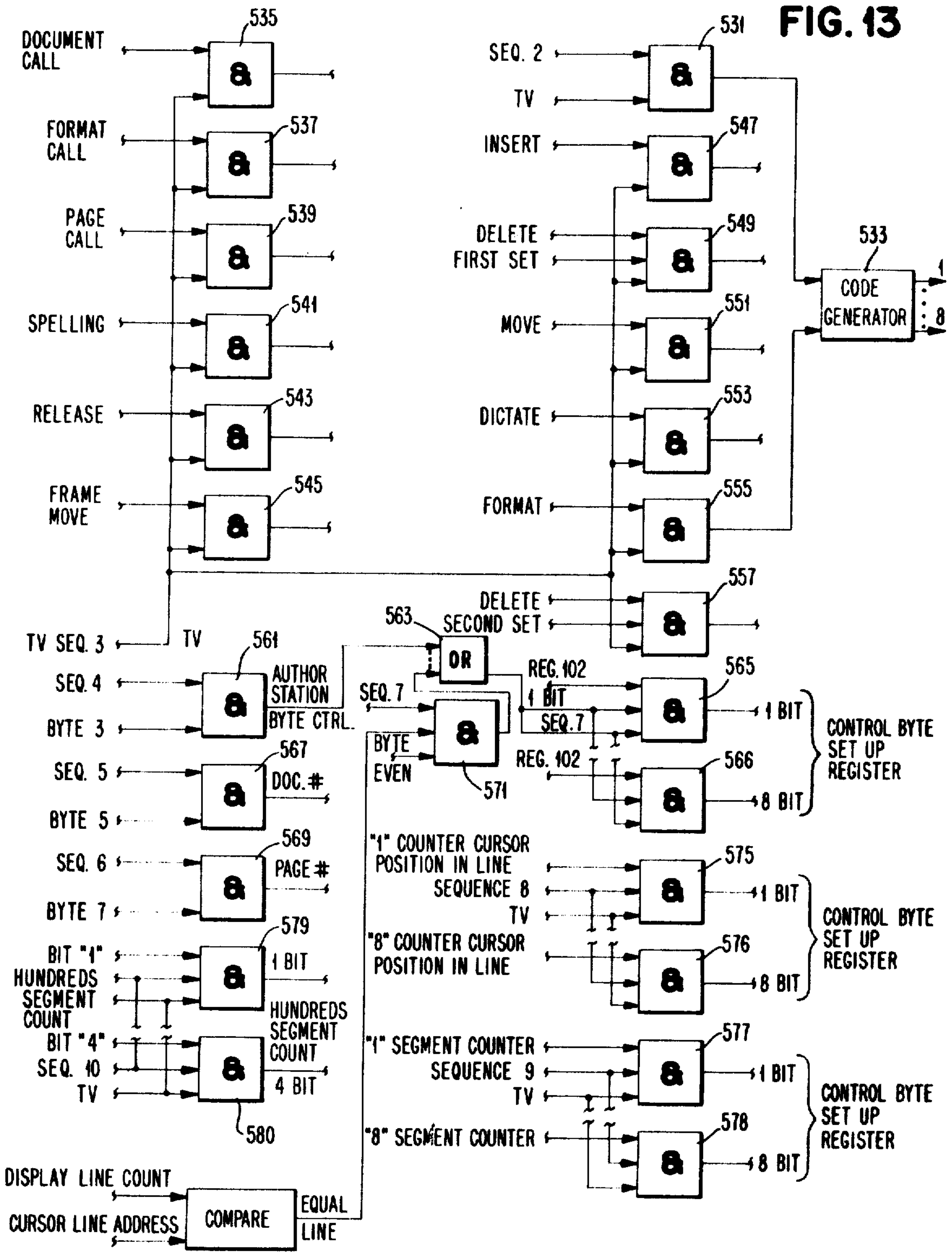
FIG. 13 is a block diagram of the instruction word generation network.

Referring now to FIG. 13 of the drawings, a block diagram of the instruction word generation network is depicted. This network is responsive to the various sequence counts of the sequence counter heretofore described and to timing pulses and control signals indicating various operations of the system. Thus, when the vertical trace pulse of a timing frame occurs when in sequence two, the AND-gate 531 provides an input signal to the code generator 533 which generates an eight-bit start byte. As has been described, the sequence counter thereafter advances to its sequence three state during the next horizontal retrace pulse. When the vertical trace pulse following the advance of the sequence counter to its sequence three state arrives, the various gating circuits 535–557 are provided with a gating signal. If the author had depressed a keybutton corresponding to a listed function, such as a page call keybutton, the corresponding gating circuit 539 would provide an output signal to the code generator 533 to effect the generation of an eight-bit instruction byte signifying that particular instruction which had been designated.

When the sequence counter advances to its 4 state, gating circuit 561 provides an output signal during control byte three time to the OR-circuit 563. The output of the OR-circuit 563 is utilized to gate the eight-bit positions of register 102 (FIG. 4) through the gating circuits 565–566 to a control byte set up register. In a similar manner the document number is gated from the register 102 during sequence five at byte time five and the page number information is gated during sequence six at byte time seven by the gating circuits 567 and 569, respectively.

It will be recalled that the author station byte, the document number byte, and the page number byte are transmitted respectively by the system controller during display control byte times three, five and seven. This information is transferred from the system controller to the register 102 of FIG. 4. The eight bit positions of this register are thus gated out when they contain the appropriate information into the control byte set up register. Additionally, the cursor line address is gated by the gating circuit 571 during even byte times. This information is gated whenever the display line count is equal to the cursor line address as stored in the display unit counter. Thus, when these counters compare equally, the cursor line byte is being transmitted by the system controller and it is this information which is transferred to the control byte set up register. The gating circuits 575–576 are utilized to transfer the eight bits of the control byte representative of the horizontal position of the cursor from the cursor counter to the control byte set up register at the vertical trace time of the eighth sequence. During sequence nine, the contents of the segment counter is transferred by the gating circuits 577–578. The hundreds position of the segment counter is gated during sequence 10 by the gating circuits 579–580.

Figure 14:
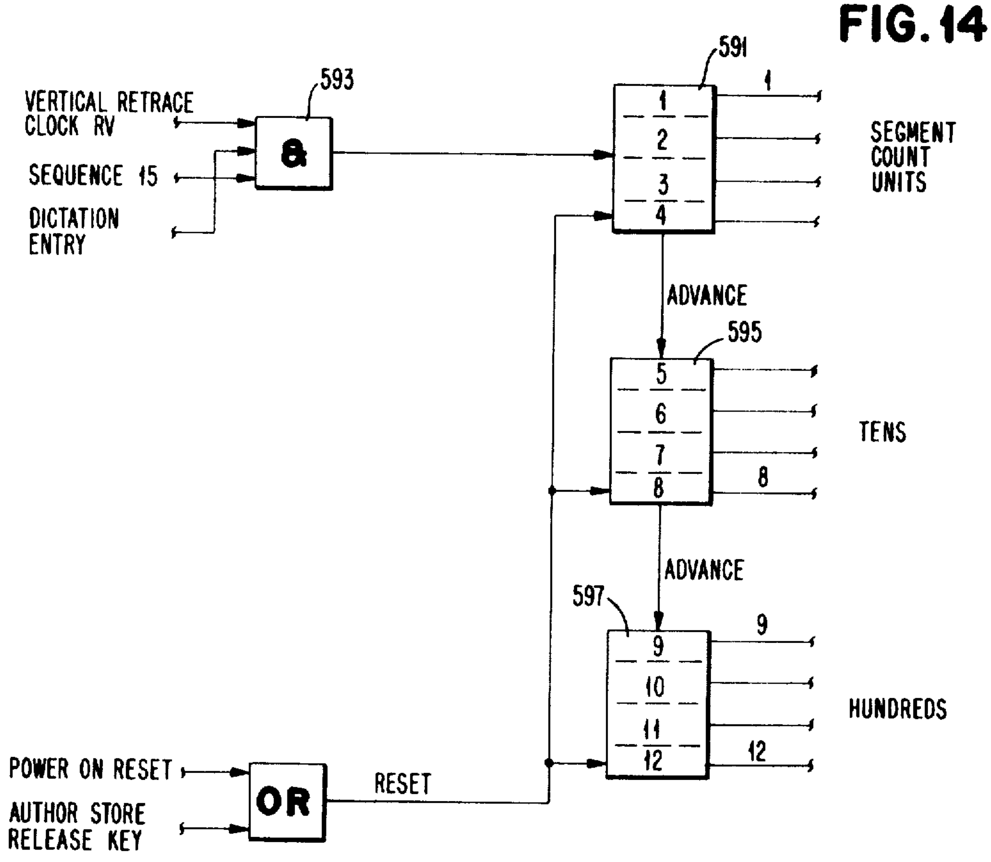
FIG. 14 is a block diagram of the segment counter.

Referring now to FIG. 14 of the drawings, a block diagram of the segment counter is depicted. This counter is the same as the segment counter schematically depicted in FIG. 4 of the drawings at block 123. The counter is a conventional counter having units tens and hundreds output, the counter being coded in modified binary coded decimal. The units counter 591 is advanced during a text entry operation whenever sequence 15 is reached by the output of the gating circuit 593. The tens counter 595 is advanced with each decade advance of the units counter and in a similar manner, the hundreds counter 597 is advanced with each decade advance of the tens counter. The entire counter is reset whenever the author station release key is depressed indicating the completion of dictation at the author station.

Figure 15:
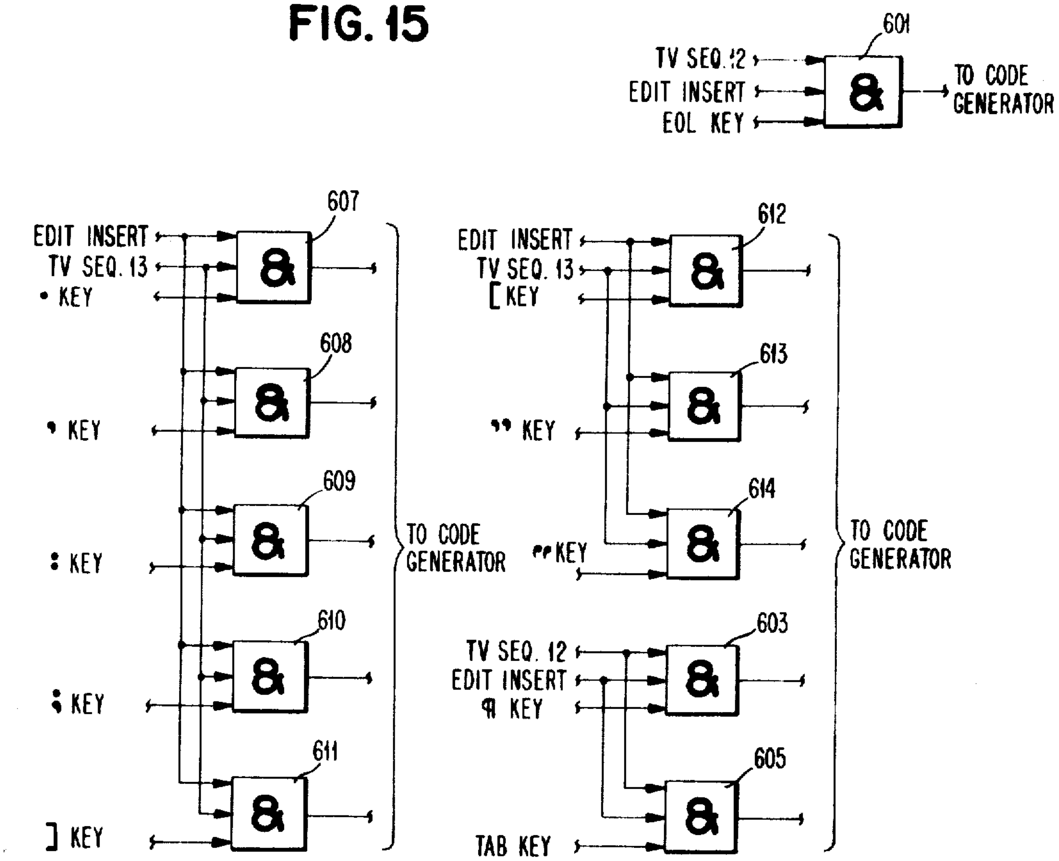
FIG. 15 is a block diagram of the punctuation and paragraph specification logic.

Referring now to FIG. 15 of the drawings a block diagram of the punctuation and paragraph specification logic of the system is depicted. During sequence 12, if an edit insert instruction specifing the end of a line or beginning or ending of a paragraph is specified, the gating circuits 601, 603 and 605 provide an output signal to the code generator to generate a symbol byte representative of the depressed keybutton. In a similar manner, during an edit insert operation and sequence 13, if a punctuation key had been depressed, the code generator is caused to generate a corresponding code by the gating circuits 607–614.

Figure 16:
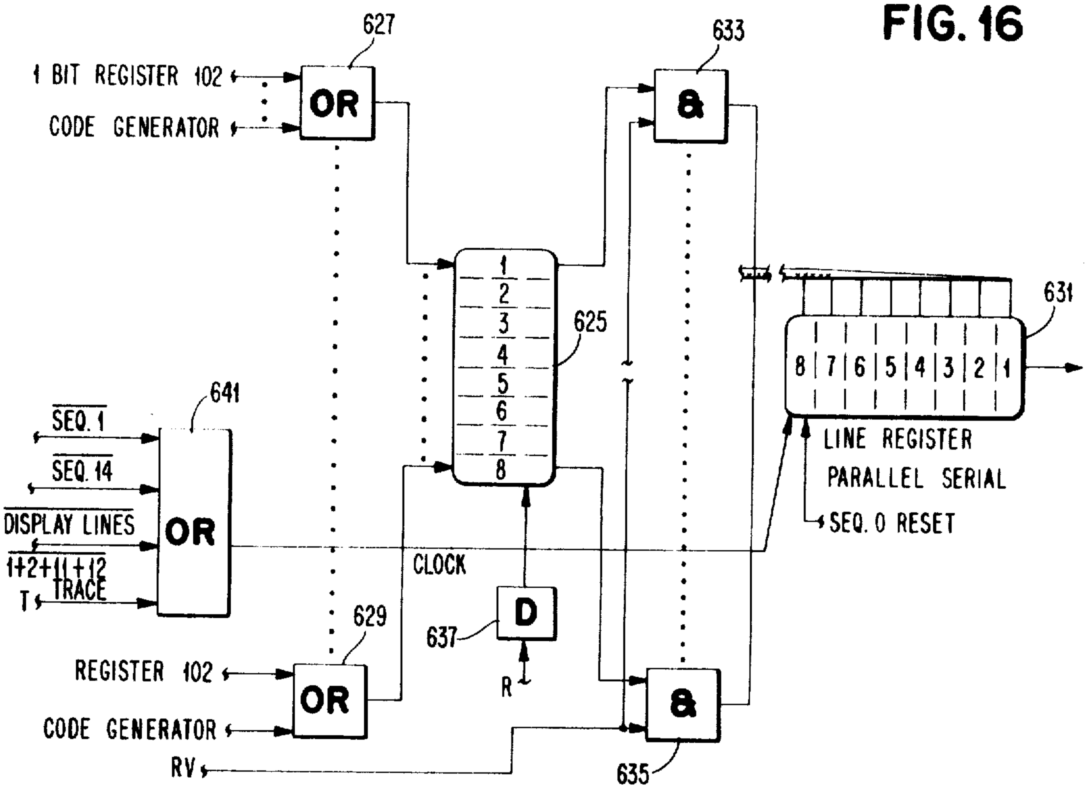
FIG. 16 is a block diagram of the control byte set up and transmitting registers.

Referring to FIG. 16 of the drawings, a block diagram of the control byte set up and transmitting registers are depicted. As has been described, a code generator and various registers including register 102 of FIG. 4 are gated at specific times to transfer eight bit bytes to the control byte set up register 625. A plurality of OR-circuits 627 thru 629 corresponding to each bit position of the control byte set up register 625 gate the register with the eight bit byte. The information in this register is transferred to the line transmit register 631 at the vertical retrace time by the gating circuits 633–635. The control byte set up register 625 is thereafter reset by a delayed vertical retrace pulse delayed by delay 637. The eight bit positions of the line transmit register are serially gated out by gating pulses supplied by the OR-circuit 641 upon the trace pulse of display lines 3–10 inclusive. The information from the line transmit register 631 is thus gated to various system utilization registers including register 305 of FIG. 8. Additionally, this information is supplied to the digital recording circuit at the author recorder. This circuit could include a register to receive the information and appropriate self-clocking or timing-track-actuated recording facilities to effect recording of the byte on the media.

Referring now once again to FIG. 1 of the drawings, the various flow paths and signal generation means of the audio responsive visual display system of the present invention have been described. It is, of course, recognized by those skilled in the art that various modifications could be made to the system without departing from the spirit and scope of the invention. For example, each author station could include a recorder 23 for recording the digital and audio signal generated at that author station. Further, a permanent display device such as a printer could be used in lieu of the temporary display device depicted. If such a device were utilized, the author would receive a printed output which he could then manually correct by making pencil insertions and deletions for a subsequent retyping by another operator. Additionally, a single centralized permanent media output device could be utilized to print a record for each author so that the author could subsequently review the materials after he has completed dictating them, it being assumed that the central station would be readily accessible to each author. In this connection, the printer 41 would be utilized as a central output device.

An additional modification that could be made to the system would be to utilize a single buffer storage adapted to receive the digital signals generated at the author station as well to receive the corresponding text entries from each transcriber station. In this manner, the buffer storage associated with each transcriber station would be centrally located. It is further recognized that various types of storage devices could be utilized at the recorder station 23 to store the digital signals in associated relationship with the audio signals. That is, instead of utilizing parallel digital and audio tracks on a signal recorder mechanism, the digital signals could be routed to a core storage device for sequential storage and an audio start and stop code could be sequentially read from the audio device, the corresponding digital identification signals could be routed to the associated transcribing station or to an appropriate system controller unit. In a similar manner, the digital signals could be routed directly to a centralized controller associated with each recorder. A further modification would be the utilization of a single recorder, the transcriber having access to the playout portion of the recorder through a switching network.

While this invention has been particularly shown and described with reference to a preferred embodiment thereof, it should be understood by those skilled in the art, that the foregoing and other changes in form and detail may be made therein without departing from the scope of the invention.

What is claimed is:

1. An audio and digital signal segmentation system comprising:

means for generating an audio record of sequentially dictated audio segments including recording means for sequentially recording and playing out audio signals corresponding to the dictated audio segments;

means for generating a digital identification signal corresponding to and identifying the relative sequence of each dictated audio segment;

a plurality of transcriber stations, each station including audio playout means responsive to said recorded audio signals for providing corresponding sound output signals and text entry means for generating digital text signals;

transfer means responsive to the recording means for transferring each audio segment to a transcriber station;

buffer storage means responsive to each generated digital identification signal and to the generated digital text signals of each transcriber station for storing said identification signal in associated relationship with text signals generated at the transcriber station receiving the audio segment corresponding to said stored identification signal; and editing means including page storage means responsive to said buffer storage means for sequentially arranging said generated text signals in accordance with the sequential identification of the stored associated identification signal and for storing said arranged text signals in said page storage means.

2. The audio and digital signal segmentation system set forth in claim 1 further comprising:

display means responsive to the page storage means and to the stored identification signals for displaying a visual representation of the arranged text signals.

3. The audio and digital signal segmentation system set forth in claim 1 wherein said recording means include digital recording and playout means responsive to the means for generating a digital identification signal for recording said digital identification signal in spacial relationship with said corresponding audio signals and wherein said buffer storage means is responsive to said digital recording means.

4. The audio and digital signal segmentation system set forth in claim 1 further comprising:

temporary display means responsive to the page storage means and to the stored identification signals for displaying a graphic representation of the arranged text signals;

visual identification means associated with each display means for visually identifying displayed graphic representation and for providing an output signal identifying said visually identified representation;

edit signal generation means for generating text edit command signals and;

wherein said editing means is further responsive to said edit command signals and the output signal of the visual identification means for performing editing functions on the stored text signals in said page storage means corresponding to the visually identified representation.

5. The audio and digital signal segmentation system set forth in claim 4 wherein said edit signal generating means generates a text delete command signal and said editing means is responsive to said delete command signal to remove stored text signals corresponding to representations visually identified.

6. The audio and digital signal segmentation system set forth in claim 4 wherein said edit signal generation means generates text signals and said editing means is responsive to an insert command signal to insert said text signals between ordered text signals corresponding to said representations visually identified.

7. An audio transcription system comprising:

a plurality of author stations, each station including means for generating audio signals and means for generating sets of digital segmentation and identification signals for segmenting and identifying corresponding segments of the audio signal;

a plurality of recorders each responsive to an author station for recording said generated audio signals and said generated digital signals in associated relationship to one another, said recorders each being responsive to a control signal for playing out a segment of said recorder audio signals and the corresponding set of recorded digital signals;

a plurality of transcriber stations each comprising an actuable audio storage and playout means responsive on actuation to a played out audio signal segment for recording said segment and responsive to a command signal for playing out a corresponding sound signal, text signal entry means, and an actuable digital storage means responsive to the corresponding set of played out recorded digital signals for storing said signals and responsive to text signals entered by said entry means for storing said text signals in associated relationship with said stored digital signals;

control means responsive to a generated digital signal set for selecting a transcriber station and actuating said audio storage means and said digital storage means of the selected transcriber station and for actuating the recorder containing a recorded digital signal corresponding to said recorded digital signal set;

switching means responsive to the control means for connecting the actuated recorder to the selected transcriber station; and editing means responsive to the digital storage means of each transcriber station for ordering the stored text signals in accordance with the information content of the associated stored digital signals.

8. The audio transcription system set forth in claim 7 wherein the number of recorders exceeds the number of transcriber stations.

9. The audio transcription system set forth in claim 7 further comprising display means responsive to the editing means for displaying graphic representations of said ordered text signals.

10. The audio transcription system set forth in claim 7 further comprising a plurality of display means each associated with an author station and each responsive to the editing means for displaying graphic representation of the ordered text symbols having an associated digital signal set generated at the associated author station.

11. The audio transcription system set forth in claim 7 further comprising:

priority storage and control means including priority storage means responsive to each generated digital signal set for storing said signal sets in said priority storage means and for assigning a relative priority for each stored signal set; and wherein said control means is responsive to said stored generated digital signal set having the highest assigned relative priority.

12. The audio transcription system set forth in claim 7 further comprising:

a plurality of temporary display means each associated with an author station and each responsive to the editing means for displaying graphic representations of the ordered text symbols having an associated digital signal set generated at the associated author station;

visual identification means associated with each display means for visually identifying displayed graphic representations and for providing an output signal identifying said visually identified representation;

edit signal generation means associated with each author station for generating text edit command signals and;

wherein said edit means is further responsive to said edit command signals and the output signal of the visual identification means for performing editing functions on the stored text signals corresponding to the visually identified representation.

* * * * *